US009838664B2

United States Patent
Doba et al.

(10) Patent No.: US 9,838,664 B2
(45) Date of Patent: Dec. 5, 2017

(54) IMAGE PROCESSING METHOD, IMAGE PROCESSING DEVICE, AND ELECTRONIC APPARATUS

(71) Applicant: Sony Corporation, Tokyo (JP)

(72) Inventors: Kentaro Doba, Tokyo (JP); Yasuhide Hyodo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/612,568

(22) Filed: Feb. 3, 2015

(65) Prior Publication Data

US 2015/0229901 A1    Aug. 13, 2015

(30) Foreign Application Priority Data

Feb. 10, 2014  (JP) ................................. 2014-023395

(51) Int. Cl.
| | | |
|---|---|---|
| *H04N 13/00* | (2006.01) | |
| *G06T 15/00* | (2011.01) | |
| *G06T 15/20* | (2011.01) | |

(52) U.S. Cl.
CPC ......... *H04N 13/0029* (2013.01); *G06T 15/20* (2013.01); *G06T 2215/16* (2013.01); *H04N 2213/003* (2013.01)

(58) Field of Classification Search
CPC ......... H04N 13/0029; H04N 2213/003; H04N 13/0033; H04N 13/0022; H04N 2013/0092; H04N 2213/002
See application file for complete search history.

(56) References Cited

U.S. PATENT DOCUMENTS

| 9,438,880 B2 | 9/2016 | Hyodo et al. | |
|---|---|---|---|
| 9,467,677 B2 | 10/2016 | Hyodo | |
| 2010/0315492 A1* | 12/2010 | Baik ................... | H04N 5/23219 348/51 |
| 2011/0090243 A1* | 4/2011 | Park .................... | H04N 13/0018 345/617 |
| 2011/0106428 A1* | 5/2011 | Park .................... | G01C 21/3623 701/533 |

(Continued)

FOREIGN PATENT DOCUMENTS

JP    2006-262191 A    9/2006

*Primary Examiner* — Tapas Mazumder
(74) *Attorney, Agent, or Firm* — Wolf, Greenfield & Sacks, P.C.

(57) ABSTRACT

Provided is an image processing method including acquiring an original image and position information indicating a position of a viewer in a depth direction with respect to a display unit, acquiring crosstalk information indicating a crosstalk characteristic of the display unit, causing a processor to generate an index map that includes control information indicating a correspondence between respective pixels and a respective viewpoints based on the position information on the basis of the acquired position information and crosstalk information in a manner that, among first viewpoint images different from each other based on the original image corresponding to the respective viewpoints set in advance, one of the first viewpoint images is observed while crosstalk is negated at a position indicated by the position information, and outputting second viewpoint images corresponding to respective pieces of the control information in the index map based on the original image and the index map.

12 Claims, 19 Drawing Sheets

(56) References Cited

U.S. PATENT DOCUMENTS

| | | | |
|---|---|---|---|
| 2011/0194756 A1* | 8/2011 | Morifuji | H04N 13/0003 |
| | | | 382/154 |
| 2015/0092026 A1* | 4/2015 | Baik | H04N 13/0018 |
| | | | 348/54 |
| 2015/0092030 A1* | 4/2015 | Lee | G02B 27/2214 |
| | | | 348/59 |
| 2015/0130914 A1 | 5/2015 | Hyodo et al. | |
| 2015/0201185 A1 | 7/2015 | Hyodo et al. | |
| 2015/0222871 A1 | 8/2015 | Doba et al. | |
| 2015/0229904 A1 | 8/2015 | Ishikawa et al. | |
| 2015/0245007 A1 | 8/2015 | Hyodo et al. | |
| 2015/0245008 A1 | 8/2015 | Hyodo | |
| 2015/0294475 A1 | 10/2015 | Takahashi et al. | |

\* cited by examiner

IMAGE PROCESSING METHOD, IMAGE PROCESSING DEVICE, AND ELECTRONIC APPARATUS

CROSS REFERENCE TO RELATED APPLICATIONS

This application claims the benefit of Japanese Priority Patent Application JP 2014-023395 filed Feb. 10, 2014, the entire contents of which are incorporated herein by reference.

BACKGROUND

The present disclosure relates to an image processing method, an image processing device, and an electronic apparatus.

There is a technology in which a plurality of virtual viewpoints are set in front of a display device such as a display and different videos can be viewed at the respective virtual viewpoints. As an application example of the technology that enables different videos to be viewed at respective virtual viewpoints, a glasses-free 3D video technology in which videos are shown with different parallax for a viewer's right and left eyes and thereby the viewer can experience videos in three dimensions is known.

Methods of using dedicated eyeglasses have been proposed as methods of showing different videos to the right and left and eyes since quite a while ago, and for example, as disclosed in JP 2006-262191A, the glasses-free 3D video technology is now known to be capable of showing 3D images without using such dedicated eyeglasses. Likewise, a technology that enables different videos to be viewed at respective virtual viewpoints without using dedicated eyeglasses has been put to practical use recently.

SUMMARY

On the other hand, when different videos can be viewed at respective virtual viewpoints without using dedicated eyeglasses, a position on which images corresponding to the respective virtual viewpoints (each of which will also be referred to hereinafter as a "viewpoint image") converge is limited. For this reason, blur or a double image arises in an observed image at a position that is different from one on which respective viewpoint images converge, and thus there are cases in which it is difficult to observe a clear image, and such a characteristic tends to appear more intense particularly due to a difference in distances from a display device.

Therefore, the present disclosure proposes a novel and improved image processing method, image processing device, and electronic apparatus that enable clear viewpoint images to be viewed at a respective plurality of viewpoints regardless of viewing positions.

According to an embodiment of the present disclosure, there is provided an image processing method including acquiring an original image, acquiring position information indicating a position of a viewer in a depth direction with respect to a display unit, acquiring crosstalk information indicating a crosstalk characteristic of the display unit, causing a processor to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information, and outputting second viewpoint images corresponding to respective pieces of the control information included in the index map based on the original image and the index map.

According to an embodiment of the present disclosure, there is provided an image processing device including an image acquisition unit configured to acquire an original image, a position information acquisition unit configured to acquire position information indicating a position of a viewer in a depth direction with respect to a display unit, a crosstalk information acquisition unit configured to acquire crosstalk information indicating a crosstalk characteristic of the display unit, an index map generation unit configured to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information, and an image generation unit configured to output second viewpoint images corresponding to respective pieces of the control information included in the index map based on the original image and the index map.

According to an embodiment of the present disclosure, there is provided an electronic apparatus including an image acquisition unit configured to acquire an original image, a position information acquisition unit configured to acquire position information indicating a position of a viewer in a depth direction with respect to a display unit, a crosstalk information acquisition unit configured to acquire crosstalk information indicating a crosstalk characteristic of the display unit, an index map generation unit configured to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information, and an image generation unit configured to output second viewpoint images corresponding to respective pieces of the control information included in the index map based on the original image and the index map.

According to one or more embodiments of the present disclosure described above, an image processing method, image processing device, and electronic apparatus that enable clear viewpoint images to be viewed at a respective plurality of viewpoints regardless of viewing positions are provided.

Note that the above-mentioned effect is not necessarily restrictive. In addition to or instead of the above-mentioned effect, there may be exerted any effect described in the specification or another effect that can be grasped based on the specification.

DETAILED DESCRIPTION OF THE EMBODIMENT(S)

Figure 1:
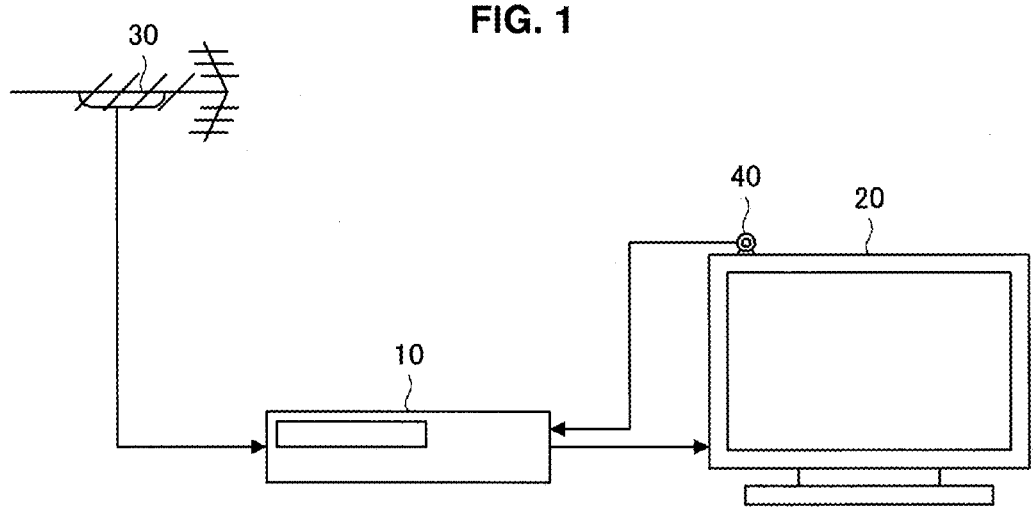
FIG. 1 is an illustrative diagram showing an example of a schematic configuration of a system including an image processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview
2. Configuration of a display device
3. Discussion of ideas
　3.1. Comparative example 1
　3.2. Comparative example 2
4. Details of an image processing device
　4.1. Overview
　4.2. Configuration
　4.3. Process flow
　4.4. Conclusion
5. Modified example
　5.1. Overview
　5.2. Configuration
　5.3. Process Flow
　5.4. Conclusion
6. Hardware configuration
7. Application examples
8. Conclusion <1. Overview>

First, the overview of an image processing device according to the embodiment will be described with reference to FIG. 1. FIG. 1 is an illustrative diagram showing an example of a schematic configuration of a system including the image processing device according to the embodiment.

As shown in FIG. 1, the image processing device 10 according to the present embodiment is connected to a display device 20 and a viewing position detection device 40. Note that all or a plurality of any of the image processing device 10, the display device 20, and the viewing position detection device 40 may be provided in the same housing. Hereinbelow, the image processing device 10, the display device 20, and the viewing position detection device 40 will be described on the assumption that they are respectively provided in separate housings.

In the display device 20 of the embodiment, a plurality of (at least two or more) virtual viewpoints are preliminarily set at given positions different from one another in front of a display plane of the display device 20, and a viewer can view viewpoint images different depending on the virtual viewpoints. With this configuration, for example, by adjusting positions of the virtual viewpoints beforehand so that different virtual viewpoints are presented to the respective right and left eyes of the viewer and displaying parallax images for which different parallax is set depending on each virtual viewpoint, the viewer can view an image with a stereoscopic effect. A glasses-free 3D display is one specific example of the display device 20.

In addition, as another example of the display device 20, respective virtual viewpoints and viewpoint images may be associated with each other so that different videos are viewed according to viewing positions of a viewer. With this configuration, it is possible to provide different videos to a respective plurality of viewers, for example, according to relative positions of the viewers with respect to the display device 20. If respective different viewpoint images are associated with a plurality of virtual viewpoints in this manner, a configuration of the display device 20 is not limited to a display device for stereoscopic viewing like a glasses-free 3D display.

Note that, hereinbelow, the display device 20 will be described on the assumption that it is configured as a glasses-free 3D display that makes stereoscopic viewing possible, for the sake of simplified description.

The viewing position detection device 40 is a device for acquiring information for detecting positions of a viewer with respect to the display plane of the display device 20. In particular, the viewing position detection device 40 acquires information for detecting positions of the viewer in the depth direction with respect to the display plane of the display device 20 (in other words, the distance between the display plane and the viewer).

As a specific example, the viewing position detection device 40 can be configured as a camera, a sensor, and the like. When the viewing position detection device 40 is configured as a camera, for example, as the viewing position detection device 40 photographs the front side of the display plane of the display device 20, a position of the viewer with respect to the display plane can be detected based on the position and the size of the viewer in a photographed image. In addition, by configuring the viewing position detection device 40 as a distance-measuring sensor, the distance between the display plane of the display device 20 and the viewer may be measured. Note that it is needless to say that a configuration of the viewing position detection device 40 is not particularly limited as long as it is possible to acquire information from which a position of a viewer in the depth direction with respect to the display plane of the display device 20 can be detected.

Note that, hereinafter, information for detecting a position of a viewer with respect to a display plane may be simply referred to as "position information of a viewer" for the sake of simplified description.

The viewing position detection device 40 outputs the acquired position information of the viewer to the image processing device 10. Accordingly, the image processing device 10 can specify the position of the viewer with respect to the display plane based on the acquired position information of the viewer.

The image processing device 10 externally acquires an original image to be displayed, generates a viewpoint image corresponding to each virtual viewpoint based on the acquired original image, and outputs the viewpoint image to the display device 20. For example, the image processing device 10 may be connected to an antenna 30 for receiving broadcasting including images such as still images and dynamic images.

Note that the original image in the explanation indicates an image that is a source for generating a viewpoint image corresponding to each virtual viewpoint, and the form of the original image is not specifically limited as long as the viewpoint image can be generated. For example, the original image may be a still image or a dynamic image. Moreover, the original image may be a so-called stereoscopic image for achieving stereoscopic vision or an image not considering stereoscopic vision (in other words, an image for one viewpoint). When an image not considering stereoscopic vision is acquired as an original image, the image processing device 10 may perform image analysis on the original image and generate each viewpoint image based on the analysis result. Also, in the case in which a stereoscopic image is used as an original image, when a viewpoint image considering more viewpoints than the stereoscopic image is necessary, the image processing device 10 may perform image analysis on the original image and generate a viewpoint image for the necessary viewpoints.

In addition, a source from which the image processing device 10 acquires an original image is not specifically limited. For example, as illustrated in FIG. 1, the image processing device 10 may receive an original image distributed as broadcasting, through the antenna 30. As another example, the image processing device 10 may read out an original image recorded in an external medium therefrom. As still another example, the image processing device 10 may include therein a storage unit for storing original images and read out an original image stored in the storage unit.

On the other hand, when different videos can be viewed at respective virtual viewpoints without using dedicated eyeglasses like a glasses-free 3D display, a position on which the viewpoint images corresponding to the respective virtual viewpoints converge is limited. For this reason, at a position different from a pre-decided observation position i.e., a position on which respective viewpoint images converge, there are cases in which blur or a double image arises in an observed image, and thus it is difficult to observe a clear image, and such a characteristic tends to appear more intense particularly due to a difference in distances from the display device.

Thus, the image processing device 10 according to the present embodiment acquires the position information of the viewer from the viewing position detection device 40 and specifies a position of the viewer with respect to the display plane based on the acquired position information. Then, the image processing device 10 generates a viewpoint image according to the position of the viewer so that a clear image is observed at the specified position of the viewer. After respective viewpoint images are generated, the image processing device 10 generates a multiple-viewpoint image using the generated respective viewpoint images, and causes the multiple-viewpoint image to be displayed on the display device 20. With this configuration, the image processing device 10 according to the present embodiment can suppress occurrence of blur and double images at a respective plurality of virtual viewpoints regardless of a position of a viewer and make it possible to view clear viewpoint images.

<2. Configuration of a Display Device>

Figure 2:
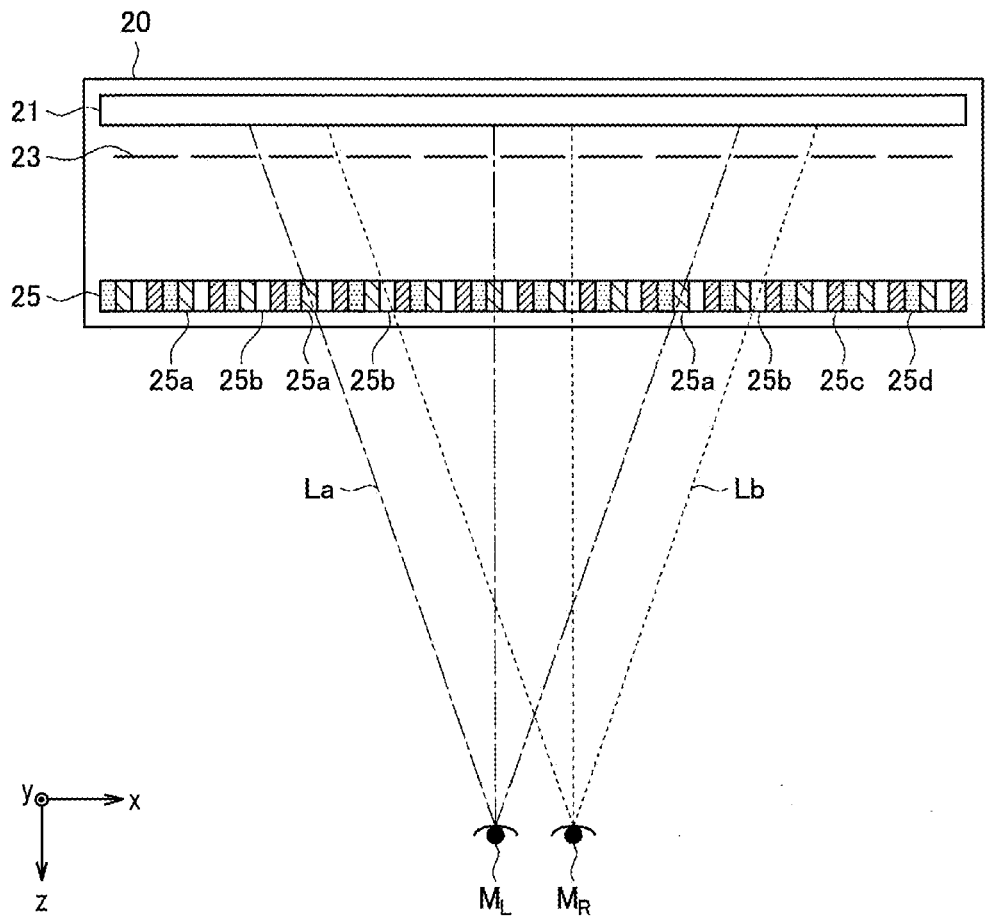
FIG. 2 is an illustrative diagram showing an example of a schematic configuration of a display device according to the embodiment.

An example of a configuration of the display device 20 according to the embodiment will be described with reference to FIG. 2. FIG. 2 is an illustrative diagram showing the example of the schematic configuration of the display device according to the present embodiment. Note that in FIG. 2, the x direction illustrated in a lateral direction represents a horizontal direction relative to a display plane of the display device 20, while the y direction illustrated in a vertical direction relative to the drawing represents a vertical direction relative to the display plane of the display device 20. The z direction illustrated in a longitudinal direction represents a depth direction relative to the display plane of the display device 20.

As illustrated in FIG. 2, the display device 20 includes a backlight 21, a barrier 23, and a display panel 25. The configuration illustrated in FIG. 2 indicates a display device (a display) using a liquid crystal panel as the display panel 25, for example, and light cast from the backlight 21 and passing through the display panel 25 reaches a viewer as an image. In the configuration illustrated in FIG. 2, the barrier 23 is provided on the front side of the backlight 21. In addition, on the front side of the barrier 23, the display panel 25 is provided at a position separated with a given distance from the barrier 23.

The barrier 23 is composed of an optical material such as a lenticular plate or a parallax barrier. On the barrier 23, openings are provided with a given interval along the x direction, and only light passing the openings of the barrier 23, among light cast from the backlight 21, reaches the display panel 25.

The display panel 25 includes a plurality of pixels. Each pixel of the display panel 25 is associated with an index indicating any one of a plurality of predetermined virtual viewpoints, and is configured to display a pixel of a parallax image corresponding to the index. Note that the association between each pixel and each index is preliminarily designed in accordance with the positional relation among the barrier 23, the display panel 25, and each virtual viewpoint.

As a specific example, in the example illustrated in FIG. 2, the display panel 25 includes pixels 25a to 25d respectively associated with indexes corresponding to different virtual viewpoints. For example, light La passing through an opening of the barrier 23 passes through the pixel 25a and converges on a virtual viewpoint $M_L$ illustrated in FIG. 2, and light Lb passing through an opening of the barrier 23 passes through the pixel 25b and converges on a virtual viewpoint $M_R$. Here, when the left eye of a viewer is positioned at the virtual viewpoint $M_L$ and the right eye of the viewer is positioned at the virtual viewpoint $M_R$, for example, a parallax image for the left eye is displayed by the pixel 25a and a parallax image for the right eye is displayed by the pixel 25b, whereby the viewer can view an image having the stereoscopic effect.

<3. Discussion of Ideas>

Next, ideas of the image processing device 10 according to the present embodiment will be discussed by describing comparative examples regarding image processing devices that generate viewpoint images based on an original image.

[3.1. Comparative Example 1]

Hereinbelow, an operation of an image processing device according to Comparative example 1 will be described with reference to FIGS. 3 to 6. With regard to the image processing device according to Comparative example 1, an image processing device that generates respective viewpoint images so that the predetermined viewpoint images for respective virtual viewpoints converge on a pre-set viewing position, i.e., a position in the depth direction with respect to the display panel 25 (i.e., display plane) of the display device 20, is exemplified.

Figure 3:
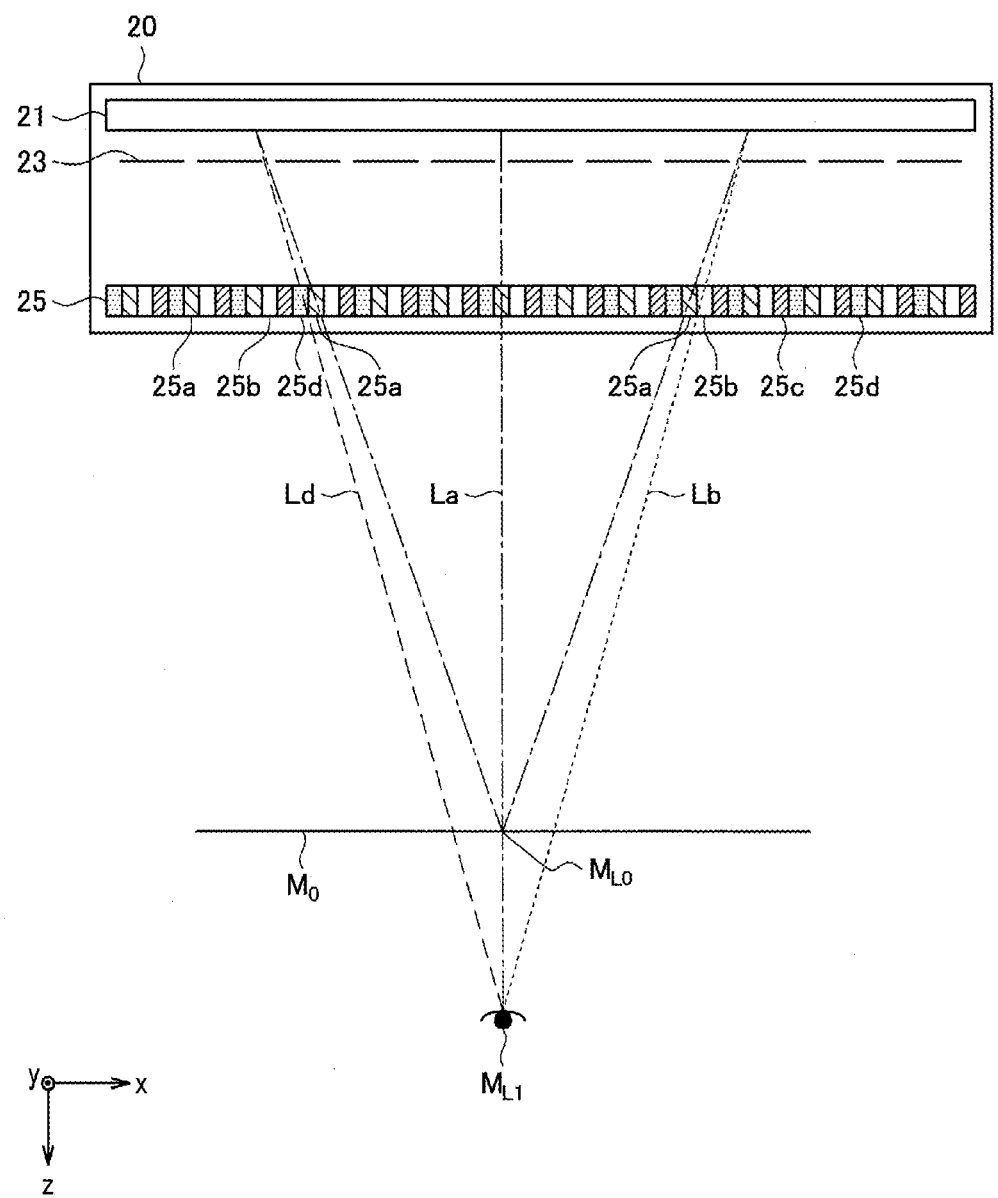
FIG. 3 is an illustrative diagram for describing a relation between a viewpoint image and a viewing position.

First, FIG. 3 will be referred to. FIG. 3 is an illustrative diagram for describing a relation between a viewpoint image and a viewing position, exemplifying a case in which the position of the viewpoint $M_L$ of FIG. 2 is changed in the depth direction (z direction). Reference numeral $M_0$ in FIG. 3 indicates the pre-set viewing position (which may be referred to hereinafter as an "optimum viewing position") i.e., a position in the depth direction set in advance with respect to the display panel 25. In addition, reference numeral $M_{L0}$ indicates a virtual viewpoint set based on the optimum viewing position $M_0$. Further, reference numeral $M_{L1}$ indicates a viewpoint obtained when the virtual viewpoint $M_{L0}$ is moved to a position different from the optimum viewing position $M_0$ in the depth direction (z direction).

As shown in FIG. 3, on the virtual viewpoint $M_{L0}$ based on the optimum viewing position $M_0$, light La that has penetrated the pixel 25a converges. In other words, at the virtual viewpoint $M_{L0}$, only a viewpoint image displayed by the pixel 25a is observed.

On the other hand, since the viewpoint $M_{L1}$ set at a position different from the optimum viewing position $M_0$ has a different condition for having light converge thereon from the case of the virtual viewpoint $M_{L0}$, the light La that has penetrated the pixel 25a, light Lb that has penetrated the pixel 25b, and light Ld that has penetrated the pixel 25d converge thereon. In other words, at the viewpoint $M_{L1}$, viewpoint images displayed by the respective pixels 25a, 25b, and 25d are observed. For this reason, when different viewpoint images are displayed by the pixels 25a, 25b, and 25d, blur or a double image is observed at the viewpoint $M_{L1}$.

Figure 4:
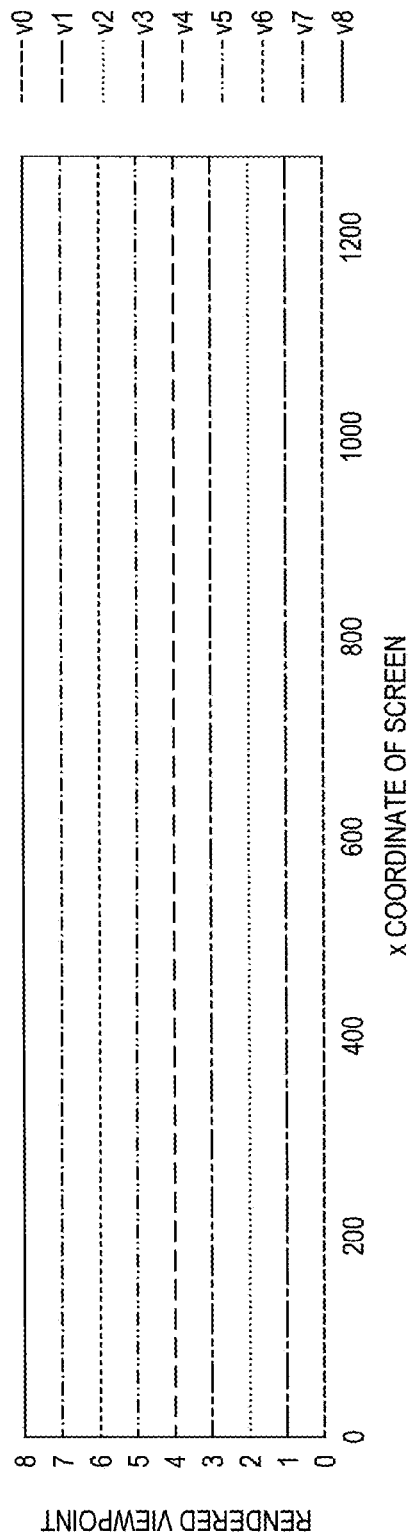
FIG. 4 is a diagram schematically showing a rendering rule of the image processing device according to Comparative example 1.

Here, an operation of the image processing device according to Comparative example 1 will be described with reference to FIGS. 4 to 6. First, FIG. 4 will be referred to. FIG. 4 is a diagram schematically showing a rendering rule of the image processing device according to Comparative example 1. Respective pixels on the screen of the display device 20 correspond in advance to any of virtual viewpoints, and the rendering rule shown in FIG. 4 shows with which viewpoint image a pixel corresponding to a predetermined virtual viewpoint is associated according to an x coordinates of the screen of the display device 20.

The vertical axis of FIG. 4 represents rendered viewpoints, i.e., to which viewpoint image a pixel corresponds. In other words, each rendered viewpoint is equivalent to an index. In addition, the horizontal axis of FIG. 4 represents x coordinates (i.e., coordinates in the horizontal direction) of the screen of the display device 20 (i.e., the display panel 25). In addition, reference numerals v0 to v8 correspond to respective virtual viewpoints. In other words, the example shown in FIG. 4 shows a case in which 9 virtual viewpoints denoted by v0 to v8 are set, and data of v0 to v8 shows respective correspondence between pixels and indexes.

As shown in FIG. 4, in the image processing device according to Comparative example 1, a predetermined viewpoint image is displayed by a pixel associated with a predetermined virtual viewpoint, regardless of the x coordinate of the pixel.

In this manner, the image processing device according to Comparative example 1 generates an index map in which pixels are associated with respective indexes based on the data shown in FIG. 4, and thereby associates the pixels with respective viewpoint images based on the index map.

Each pixel constituting the display panel 25 is associated with any of the virtual viewpoints v0 to v8, and a viewpoint image indicated by its corresponding index (in other words, rendered viewpoint) is displayed therein based on the rendering rule shown in FIG. 4. Note that, when respective viewpoint images are displayed based on a process of the image processing device according to Comparative example 1, the viewpoint images corresponding to an index 0 (in other words, a rendered viewpoint 0) are displayed by all pixels associated with the virtual viewpoint v0 at all times, for example, regardless of their positions in the x direction as shown in FIG. 4. The same applies to the pixels each associated with the virtual viewpoints v1 to v8. In other words, a viewpoint image corresponding to an index 8 is displayed by all pixels associated with the virtual viewpoint v8 at all times, regardless of its position in the x direction.

For this reason, in the example shown in FIG. 3 of the image processing device according to Comparative example 1, for example, light from pixels associated with a predetermined index is observed at the virtual viewpoint $M_{L0}$ that is based on the optimum viewing position $M_0$, and light from pixels associated with other indexes is observed at the viewpoint $M_{L1}$. In other words, a clear image is observed at the virtual viewpoint $M_{L0}$ that is based on the optimum viewing position $M_0$, but blur or a double image is observed at the viewpoint $M_{L1}$ set at the position different from the optimum viewing position $M_0$.

Here, a viewpoint image observed at the viewpoint $M_{L1}$ that is set at the position different from the optimum viewing position $M_0$ when the image processing device according to Comparative example 1 is applied will be described in more detail with reference to FIGS. 5 and 6. FIG. 5 shows an example of crosstalk ratios of light beams emitted from respective pixels of the display panel 25. The vertical axis of FIG. 5 represents crosstalk ratios, i.e., relative amounts of crosstalk. In addition, the horizontal axis of FIG. 5 represents the x coordinates (i.e., coordinates in the horizontal direction) of the screen of the display device 20 (i.e., the display panel 25). In other words, the example shown in FIG. 5 shows to what extent crosstalk (i.e., leakage of another viewpoint image) will occur in respective pixels of the display panel 25.

Figure 6:
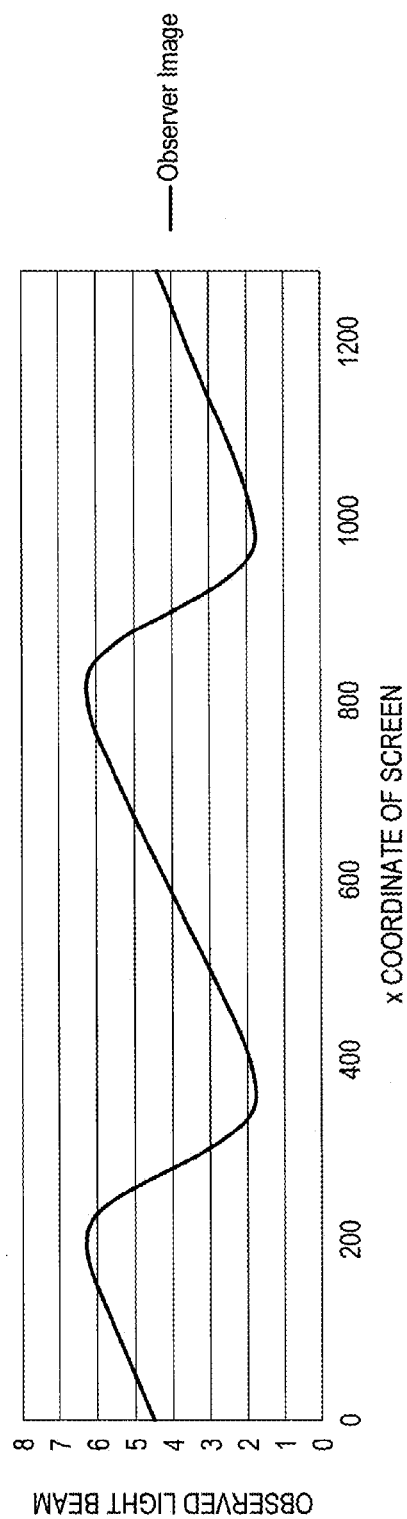
FIG. 6 is a diagram schematically showing an example of a light beam observed based on a process result of the image processing device according to Comparative example 1.

Next, FIG. 6 will be referred to. FIG. 6 is a diagram schematically showing viewpoint images observed according to positions of the viewpoint $M_{L1}$ in the x direction when the respective viewpoint images are associated with respective pixels using the index map based on the rendering rule shown in FIG. 4. The vertical axis of FIG. 6 represents observed light beams, in other words, light beams of viewpoint images to be observed corresponding to any of viewpoints among the indexes 0 to 8. In addition, the horizontal axis represents x coordinates (i.e., coordinates in the horizontal direction) of the screen of the display device 20 (i.e., the display panel 25).

Note that the example shown in FIG. 6 shows the case in which the viewpoint $M_{L1}$ is associated with the virtual viewpoint v4, and in other words, shows to which index a viewpoint image to be observed at the virtual viewpoint v4 corresponds.

For example, in the case of the virtual viewpoint v4, it is desirable that only a viewpoint image corresponding to any index (for example, the index 4) among respective viewpoint images corresponding to the indexes 0 to 8 be observed, regardless of a position in the x direction (i.e., the horizontal direction). In the example shown in FIG. 6, however, it is found that viewpoint images corresponding to the indexes other than the index 4 are also observed due to influence of crosstalk shown in FIG. 5, and indexes (i.e., observed viewpoint images) also remarkably change according to positions in the x direction.

When the image processing device according to Comparative example 1 is applied as described above, a plurality of different viewpoint images are observed at the viewpoint $M_{L1}$ set at the position different from the optimum viewing position $M_0$. In other words, a viewer observes blur or a double image.

[3.2. Comparative Example 2]

Next, an image processing device according to Comparative example 2 will be described. As described above, when the image processing device according to Comparative example 1 is applied, there are cases in which blur or a double image is observed at the viewpoint $M_{L1}$ set at the position different from the optimum viewing position $M_0$.

In order to resolve such restriction regarding a viewing position, the image processing device according to Comparative example 2 detects a position of a viewer in the depth direction with respect to the display panel 25 and switches viewpoint images displayed by respective pixels according to the detected position. In other words, the image processing device according to Comparative example 2 estimates a deviation of viewpoint images observed by a viewer according to a position of the viewer, and transposes the viewpoint images displayed by respective pixels so as to cancel the estimated deviation, and thereby the viewer can observe a clear image.

Figure 7:
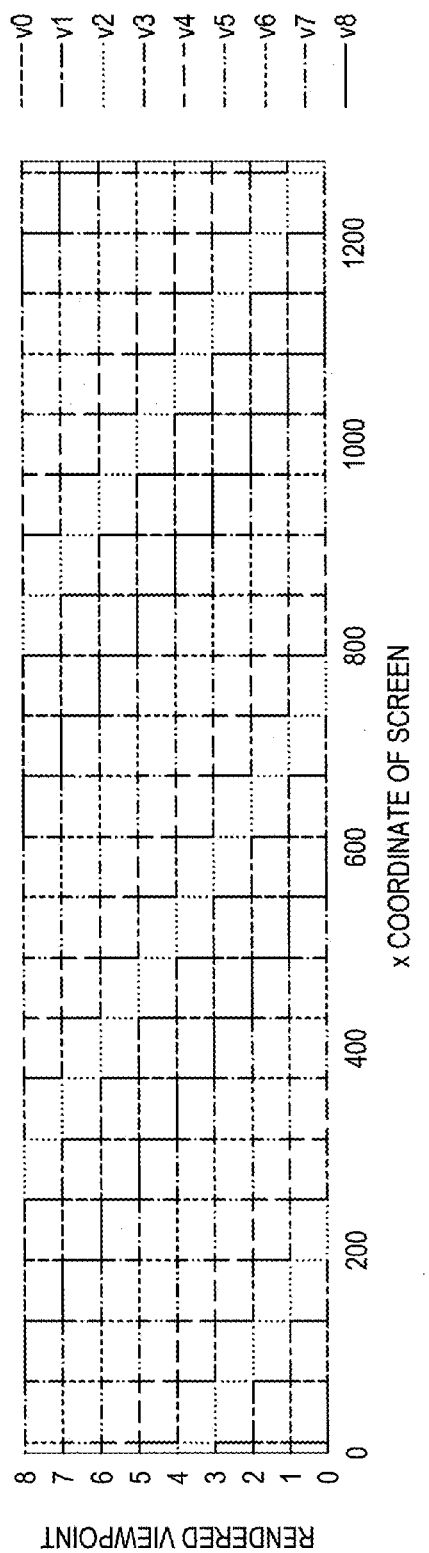
FIG. 7 is a diagram schematically showing a rendering rule of an image processing device according to Comparative example 2.

Hereinbelow, an operation of the image processing device according to Comparative example 2 will be described with reference to FIGS. 7 and 8. First, FIG. 7 will be referred to. FIG. 7 is a diagram schematically showing a rendering rule of the image processing device according to Comparative example 2. The rendering rule shown in FIG. 7 shows with which viewpoint image pixels that corresponding to predetermined virtual viewpoints are associated according to the x coordinates of the screen of the display device 20 in the image processing device according to Comparative example 2.

Note that the representation of the vertical axis and the horizontal axis of FIG. 7 with regard to reference numerals v0 to v8 is the same as in FIG. 4 (the case of the image processing device according to Comparative example 1). In other words, in the example shown in FIG. 7, the case in which 9 virtual viewpoints indicated by v0 to v8 are set as in FIG. 4 is shown, and data of the virtual viewpoints v0 to v8 indicates correspondences between respective pixels and respective indexes.

As shown in FIG. 7, in the image processing device according to Comparative example 2, viewpoint images that are different according to the x coordinates of pixels are displayed by the pixels associated with predetermined virtual viewpoints. To be specific, in this case, the pixels associated with predetermined virtual viewpoints display any viewpoint image among the 9 viewpoint images generated in advance corresponding to the virtual viewpoints v0 to v8. That is to say, in the image processing device according to Comparative example 2, the viewpoint images set to be displayed by the pixels are switched to any one of the 9 viewpoint images generated in advance and displayed according to the x coordinates of the pixels.

In this manner, the image processing device according to Comparative example 2 generates an index map on which respective pixels are associated with respective indexes based on the data shown in FIG. 7, and associates the respective pixels with the respective viewpoint images based on the index map.

In addition, the example shown in FIG. 7 shows a rendering rule when a position of a viewer is different from the optimum viewing position $M_0$ (for example, the position indicated by the viewpoint $M_{L1}$).

As shown in FIG. 7, the image processing device according to Comparative example 2 estimates a deviation of viewpoint images observed by the viewer according to positions of the viewer, and transposes the viewpoint images displayed by respective pixels so as to cancel the estimated deviation. With this configuration, the respective pixels associated with the respective virtual viewpoints (v0 to v8) display the viewpoint images each corresponding to any of the indexes 0 to 8 according to the positions in the x direction.

Figure 8:
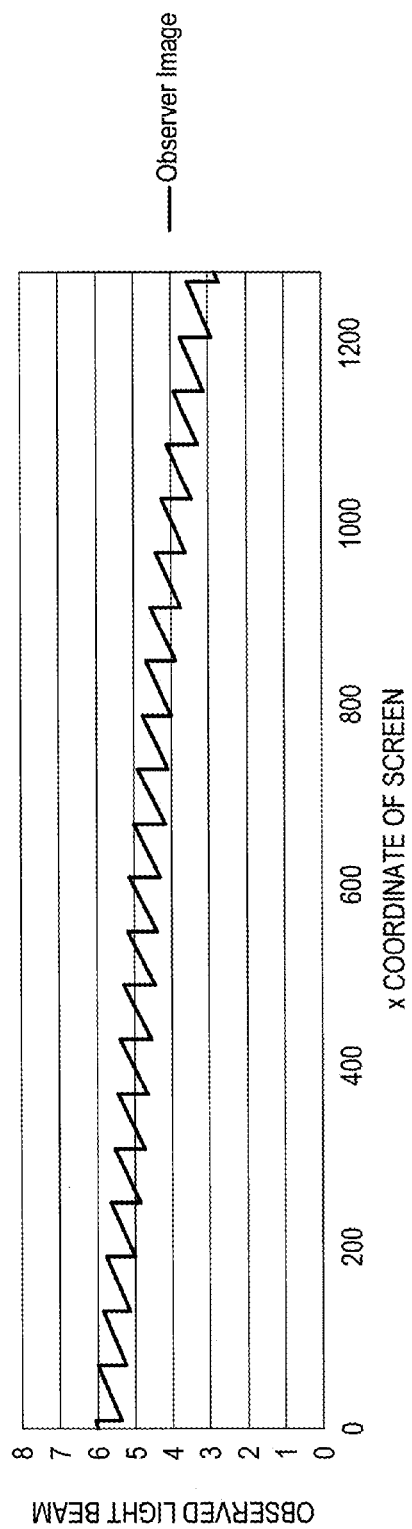
FIG. 8 is a diagram schematically showing an example of light beams observed based on a process result of the image processing device according to Comparative example 2.

FIG. 8 is a diagram schematically showing an example of viewpoint images observed according to the positions of the viewpoint $M_{L1}$ in the x direction when respective viewpoints are associated with respective pixels using the index map based on the rendering rule shown in FIG. 7. Note that the vertical axis and the horizontal axis of FIG. 8 are the same as those of FIG. 6 (the case of the image processing device according to Comparative example 1).

Note that the example of FIG. 8 shows the same case in which the viewpoint $M_{L1}$ is associated with the virtual viewpoint v4 as in the example shown in FIG. 6, and in other words, shows to which index a viewpoint image to be observed at the virtual viewpoint v4 corresponds.

From comparison to the example shown in FIG. 6 (i.e., the case of the image processing device according to Comparative example 1), it is found that a deviation of the indexes (i.e., a deviation of viewpoint images to be observed) converges more in the example shown in FIG. 8 than in the example shown in FIG. 6. For this reason, it is found that, by applying the image processing device according to Comparative example 2, occurrence of blur or a double image is also partially suppressed at the viewpoint $M_{L1}$ set at the position different from the optimum viewing position $M_0$ in comparison to the image processing device according to Comparative example 1.

On the other hand, when the slope of the graph of FIG. 8 is noted, it is found that, even when the image processing device according to Comparative example 2 is applied, different viewpoint images are still observed according to the positions on the screen. In addition, it is found in the example of FIG. 8 that periodic deviations of the indexes (i.e., deviations of observed viewpoint images) occur due to influence of crosstalk.

Figure 9:
FIG. 9 is a diagram showing an example of an original image.

Here, an example of an image observed at the viewpoint $M_{L1}$ when the image processing device according to Comparative example 2 is applied will be described with reference to FIGS. 9 and 10. The image V10 shown in FIG. 9 shows an example of an original image. In addition, the image V20 shown in FIG. 10 shows the example of the image observed at the viewpoint $M_{L1}$ based on a process result of the image processing device according to Comparative example 2 using the image V10 shown in FIG. 9 as an input.

Figure 10:
FIG. 10 is a diagram showing an example of an image observed based on a process result of the image processing device according to Comparative example 2.

As is found with reference to the image V20 shown in FIG. 10, due to remaining deviation of viewpoint images or a periodic deviation of viewpoint images caused by influence of crosstalk, periodic ruffles in the depth direction occur or distortion of a viewpoint such as blur or a double image occurs in parts of the screen.

Thus, by alleviating the remaining deviation of viewpoint images or periodic deviation of viewpoint images caused by influence of crosstalk, the image processing device 10 according to the present embodiment provides viewpoint images of which distortion of viewpoints is reduced at a respective plurality of viewpoints, regardless of positions of a viewer (i.e., viewpoint positions). Accordingly, the viewer can view a clearer image than with the image processing devices according to Comparative examples 1 and 2. Thus, in the following description, details of the image processing device 10 according to the present embodiment, particularly, a process of generating each viewpoint image based on an original image according to a position of a viewer, will be focused on.

<4. Details of an Image Processing Device>
[4.1. Overview]

First, an overview of an operation of the image processing device 10 according to the present embodiment will be described. The image processing device 10 according to the present embodiment detects a position (particularly, a position in the depth direction) of a viewer with respect to the display panel 25 of the display device 20 based on information output from the viewing position detection device 40. In addition, the image processing device 10 computes influence of crosstalk at the detected position (the position in the depth direction) of the viewer based on data indicating a crosstalk characteristic of the display device 20 (which may be referred to hereinafter as "crosstalk information"), and corrects the index map so as to negate the computed influence of crosstalk.

Figure 5:
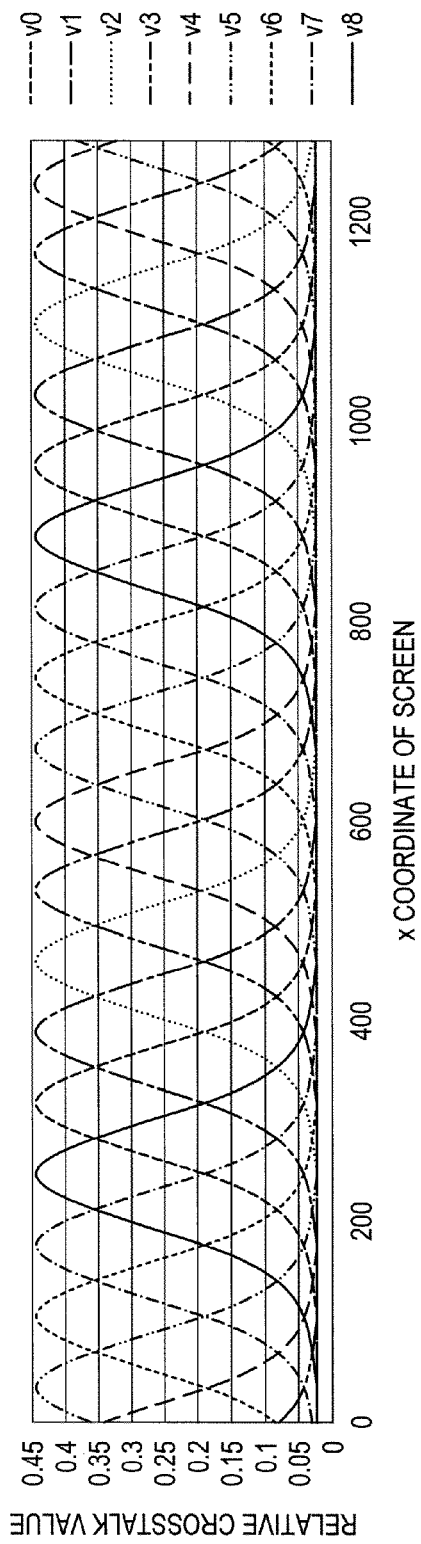
FIG. 5 is a diagram showing an example of crosstalk ratios of light beams emitted from respective pixels of a display panel.

Note that the crosstalk information of the display device 20 is data indicating in which direction of the front of the display panel 25 (in other words, at what radiation angle) light is radiated from each pixel (for example, data of FIG. 5). In other words, the crosstalk information shows the extent of crosstalk (leakage of light from adjacent pixels) occurring in each pixel of the display panel 25. For this reason, it is possible to compute what amount of light from which pixel reaches a viewing position in front of the display panel 25 based on the crosstalk information, and in other words, it is possible to compute influence of crosstalk at a position of the viewer.

Note that the crosstalk information of the display device 20 is decided according to a positional relation between the barrier 23 and the display panel 25 of the display device 20. For this reason, the crosstalk information of the display device 20 can be generated beforehand according to a configuration of the display device 20. In addition, the crosstalk information of the display device 20 can also be acquired beforehand by, for example, measuring leakage of light from respective pixels of the display panel 25. For this reason, the crosstalk information of the display device 20 may be generated or acquired in advance, and stored in a location from which it can be read out by the image processing device 10 (for example, in the image processing device 10 itself or the display device 20).

Note that details of a process performed by the image processing device 10 relating to the computation of the influence of crosstalk at a position of a viewer based on the crosstalk information of the display device 20 will be described separately.

Figure 11:
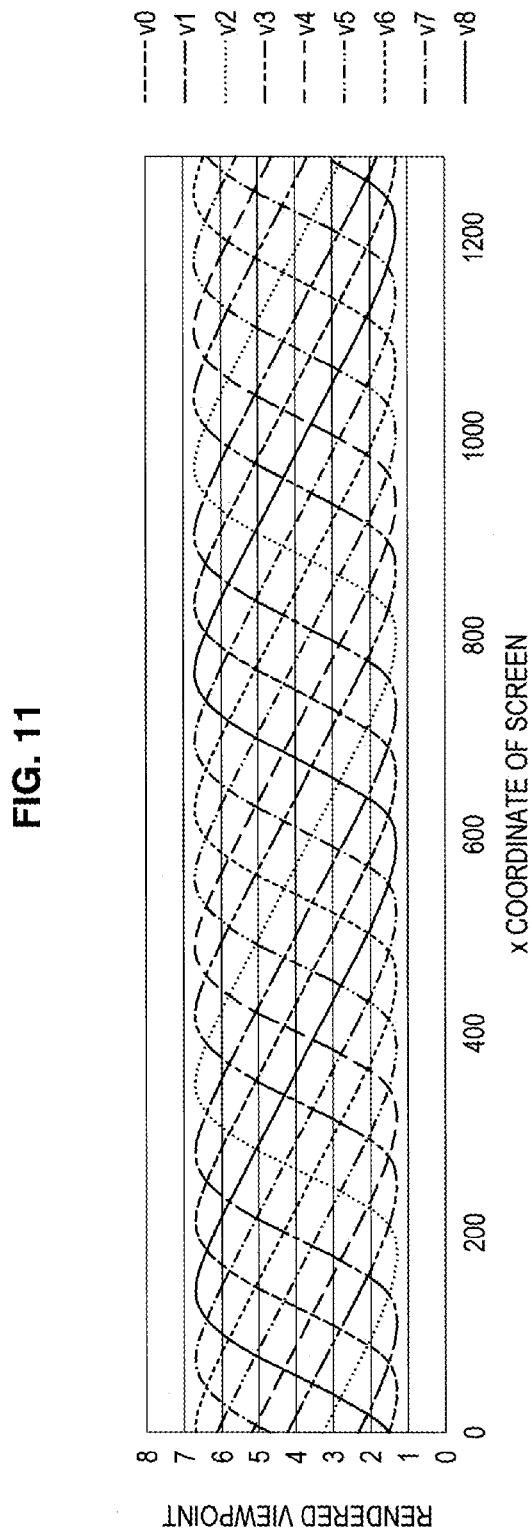
FIG. 11 is a diagram schematically showing a rendering rule of the image processing device according to an embodiment of the present disclosure.

FIG. 11 is a diagram schematically showing a rendering rule of the image processing device 10 according to the present embodiment. Note that representation of the vertical axis and the horizontal axis of FIG. 11 with regard to reference numerals v0 to v8 is the same as in FIG. 4 (the case of the image processing device according to Comparative example 1) and FIG. 7 (the case of the image processing device according to Comparative example 2). In other words, the example shown in FIG. 11 shows the case in which the 9 virtual viewpoints denoted by v0 to v8 are set as in FIGS. 4 and 7, and data of the virtual viewpoints v0 to v8 shows correspondences between respective pixels and respective indexes.

In addition, the example shown in FIG. 11 shows the rendering rule when a position of a viewer is different from the optimum viewing position $M_0$ (for example, the case of the position denoted by the viewpoint $M_{L1}$) as in FIG. 7. Note that crosstalk of light from the display panel 25 is assumed to be as shown in FIG. 5.

The image processing device 10 according to the present embodiment computes indexes of viewpoint images observed at positions of the viewer based on the detected positions of the viewer and data indicating the crosstalk characteristic of the display device 20 shown in FIG. 5. Then, the image processing device 10 sets the rendering rule (i.e., of FIG. 11) so as to negate crosstalk based on the computation results of the indexes of the viewpoint images observed at the positions of the viewer, and then generates an index map based on the rendering rule. After the index map is generated, the image processing device 10 generates the viewpoint images corresponding to the respective indexes included in the generated index map, and associates the respective generated viewpoint images with respective pixels based on the index map.

Figure 12:
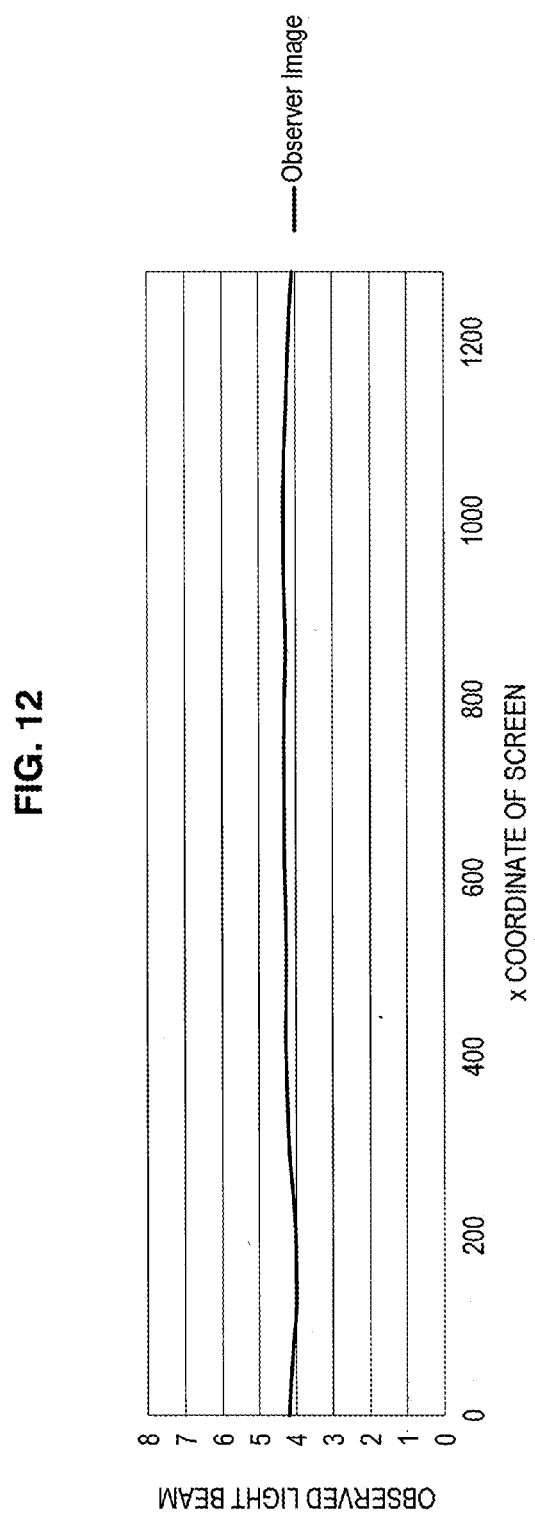
FIG. 12 is a diagram schematically showing an example of a light beam observed based on a process result of the image processing device according to the embodiment.

FIG. 12 is a diagram schematically showing an example of viewpoint images observed according to the position of the viewpoint $M_{L1}$ in the x direction when respective viewpoint images are associated with respective pixels using the index map based on the rendering rule shown in FIG. 11. Note that the vertical axis and the horizontal axis of FIG. 12 represent the same as those in FIG. 6 (the case of the image processing device according to Comparative example 1) and FIG. 8 (the case of the image processing device according to Comparative example 2).

Note that the example shown in FIG. 12 shows the case in which the viewpoint $M_{L1}$ is associated with the virtual viewpoint v4 as in the examples shown in FIGS. 6 and 8, and in other words, shows to which index a viewpoint image to be observed at the virtual viewpoint v4 corresponds.

As shown in FIG. 12, according to the image processing device 10 of the present embodiment, it is found that deviations of the indexes (i.e., deviations of viewpoint images to be observed) converge and only a viewpoint image corresponding to the index 4 is observed, regardless of positions in the x direction (i.e., the horizontal direction). In addition, as is found from comparison to FIG. 8 (the case of the image processing device according to Comparative example 2), periodic deviations of the indexes caused by influence of crosstalk (i.e., deviations of the viewpoint images to be observed) are suppressed in the example shown in FIG. 12.

Figure 13:
FIG. 13 is a diagram showing an example of an image observed based on the process result of the image processing device according to the embodiment.

An image V30 shown in FIG. 13 shows an example of an image observed at the viewpoint $M_{L1}$ based on the process result of the image processing device 10 according to the present embodiment using the image V10 shown in FIG. 9 as an input.

As is found from comparison of the image V30 shown in FIG. 13 to the image V20 shown in FIG. 10 (the case of the image processing device according to Comparative example 2), according to the image processing device 10 of the present embodiment, periodic ruffles in the depth direction and distortion of a viewpoint such as partial blur or double image are alleviated.

Figure 14:
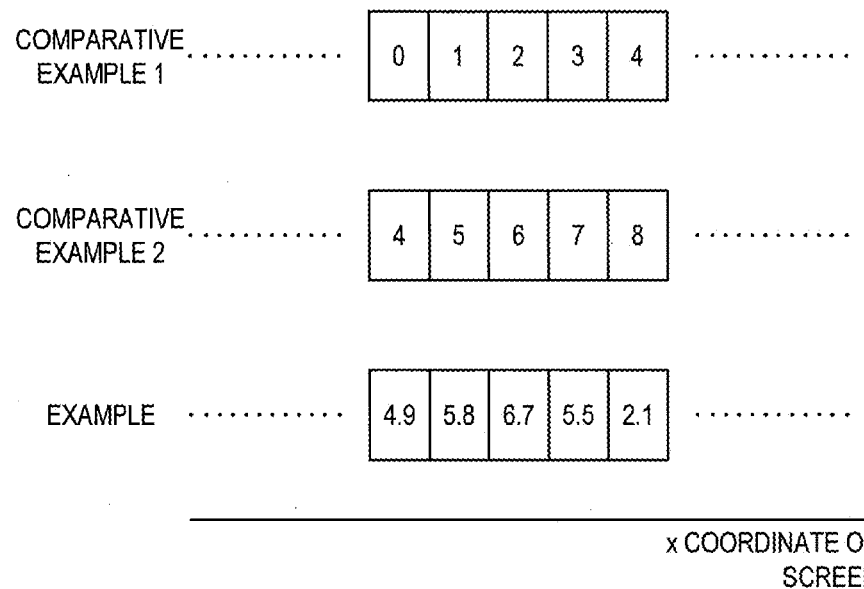
FIG. 14 is a diagram schematically showing an example of correspondences between respective pixels and indexes based on a rendering rule.

FIG. 14 is a diagram schematically showing an example of correspondences between respective pixels and indexes based on a rendering rule, showing examples of process results of the image processing device according to respective Comparative example 1, Comparative example 2, and the present embodiment. Focusing on some pixels of the display panel 25, FIG. 14 shows with what index the pixels are associated in respective cases of Comparative example 1, Comparative example 2, and the present embodiment, exemplifying a case in which a viewer is located at a position different from the optimum viewing position $M_O$ (for example, the viewpoint $M_{L1}$). Note that "Example" in FIG. 14 corresponds to an example of the process result of the image processing device 10 according to the present embodiment.

As shown in FIG. 14, with respect to the process result of the image processing device according to Comparative example 1, the respective pixels are associated with indexes set in advance based on the optimum viewing position $M_O$ regardless of a position of a viewer. On the other hand, with respect to the process result of the image processing devices according to Comparative example 2 and Example, when the viewer is located at a position different from the optimum viewing position $M_O$, the indexes associated with the respective pixels are corrected according to the position. With this configuration, even when the viewer is located at a position different from the optimum viewing position $M_O$, the image processing devices according to Comparative example 2 and Example suppress occurrence of blur or a double image caused by deviations of viewpoint images to be observed (deviations of the indexes).

Next, Comparative example 2 and Example will be compared. As is found with reference to the rendering rule shown in FIG. 7, the image processing device according to Comparative example 2 corrects the index map so that the indexes 0, 1, 2, . . . , and 8 set in advance based on the optimum viewing position $M_O$ are transposed. For this reason, occurrence of blur and double images is partially suppressed as shown in FIGS. 8 and 10; however, periodic deviations of the indexes caused by influence of crosstalk remain, which become apparent as periodic ruffles in the depth direction or partial distortion of a viewpoint.

On the other hand, as is found with reference to the rendering rule shown in FIG. 11, the image processing device according to Example generates indexes in which the influence of crosstalk is reflected, in addition to the existing indexes 0, 1, 2, . . . , and 8 in order to negate the influence of crosstalk. In FIG. 14, for example, the indexes denoted by "4.9," "5.8," "6.7," "5.5," and "2.1" show indexes set so as to negate the influence of crosstalk.

As described above, the image processing device according to Example generates the indexes in addition to the existing indexes 0, 1, 2, . . . , and 8 so as to negate the influence of crosstalk according to a position of a viewer and associates the indexes with respective pixels. In addition, the image processing device generates viewpoint images corresponding to the respective generated indexes, and causes the generated viewpoint images to be displayed by the pixels associated with the indexes which correspond to the viewpoint images.

With this configuration, according to the image processing device of Example, the leakage of crosstalk is negated, and the viewpoint images that correspond to indexes associated therewith in advance among the existing indexes 0, 1, 2, . . . , and 8 are observed at respective virtual viewpoints. In other words, according to the image processing device of Example, the viewer can observe the viewpoint images in which periodic ruffles in the depth direction and distortion of a viewpoint such as partial blur or a double image are alleviated like the viewpoint image V30 shown in FIG. 13, regardless of a viewing position.

In addition, the image processing device 10 according to the present embodiment generates the indexes as shown in FIG. 14 so as to negate the influence of crosstalk caused according to a position of the viewer in addition to the existing indexes 0, 1, 2, . . . , and 8. For this reason, it is needless to say that a larger number of viewpoint images are generated than in the image processing devices according to Comparative examples 1 and 2. In other words, the image processing device 10 according to the present embodiment generates a larger number of viewpoint images than the number of viewpoint images actually observed at the respective virtual viewpoints.

Note that the viewpoint images actually observed at the respective virtual viewpoints, i.e., the viewpoint images corresponding to the existing indexes 0, 1, 2, . . . , and 8, are equivalent to "first viewpoint images." In addition, the viewpoint images actually generated by the image processing device 10, i.e., the viewpoint images corresponding to the indexes generated so as to negate the influence of crosstalk, are equivalent to "second viewpoint images."

[4.2. Configuration]

Figure 15:
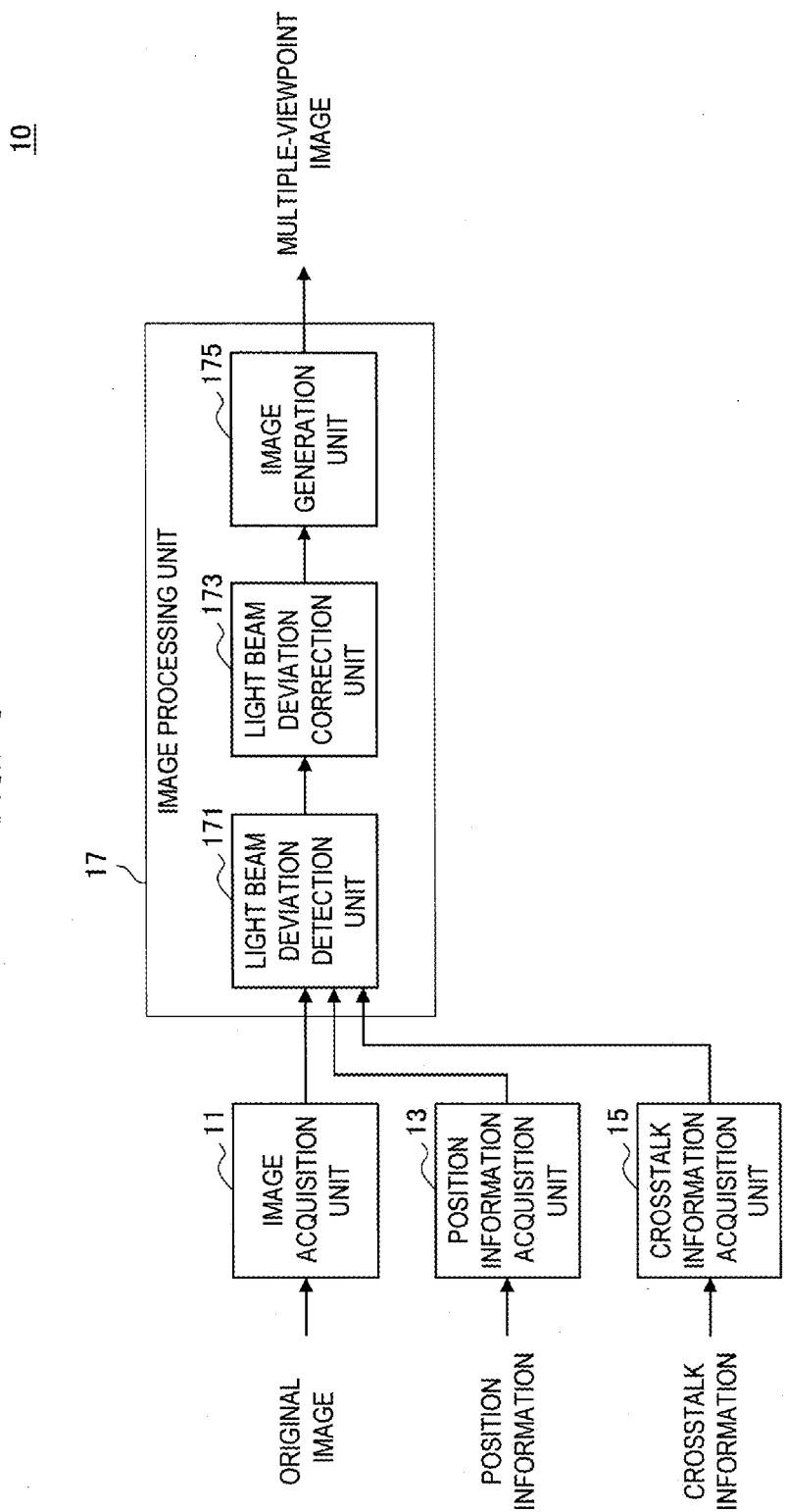
FIG. 15 is a block diagram showing an example of a functional configuration of the image processing device according to the embodiment.

Next, a configuration of the image processing device 10 according to the present embodiment will be described with reference to FIG. 15, particularly focusing on a process relating to generation of each viewpoint image and the index map. FIG. 15 is a block diagram showing an example of a functional configuration of the image processing device 10 according to the present embodiment.

As shown in FIG. 15, the image processing device 10 according to the present embodiment includes an image acquisition unit 11, a position information acquisition unit 13, a crosstalk information acquisition unit 15, and an image processing unit 17. In addition, the image processing unit 17 includes a light beam deviation detection unit 171, a light beam deviation correction unit 173, and an image generation unit 175.

The image acquisition unit 11 externally acquires an original image that is a source for generating each viewpoint image to be displayed by the display device 20. As described above, the image acquisition unit 11 may receive an original image distributed as broadcasting, through the antenna 30, or read out an original image stored in an external medium from the external medium.

In addition, the image acquisition unit 11 acquires a parallax map indicating distribution of parallaxes between different viewpoint images (e.g., between an image for the left eye and an image for the right eye) that are set for pixels in an original image. Here, the image acquisition unit 11 may externally acquire a parallax map, similarly to an original image. As another example, the image acquisition unit 11 may analyze an acquired original image and generate a parallax map based on the analysis result.

The image acquisition unit 11 outputs the acquired original image and the parallax map to the light beam deviation detection unit 171.

The position information acquisition unit 13 acquires position information of a viewer from, for example, the viewing position detection device 40 (see FIG. 1). The position information acquisition unit 13 specifies a position of the viewer (particularly, a position in the depth direction) with respect to the display panel 25 of the display device 20 based on the acquired position information, and notifies the light beam deviation detection unit 171 of the specified position of the viewer. Accordingly, the light beam deviation detection unit 171 can recognize the position of the viewer with respect to the display panel 25.

Note that the viewing position detection device 40 may be included in the image processing device 10 as long as it can acquire the position information of the viewer with respect to the display panel 25 of the display device 20. In this case, the position information acquisition unit 13 may operate as the viewing position detection device 40.

The crosstalk information acquisition unit 15 acquires crosstalk information of the display device 20. Note that the crosstalk information may be generated beforehand based on, for example, the configuration of the display device 20 as described above, and may be stored in a location from which it can be read by the crosstalk information acquisition unit 15 (for example, a storage unit inside the image processing device 10 or the display device 20).

In addition, the crosstalk information of the display device 20 can also be acquired beforehand by measuring leakage of light from respective pixels of the display panel 25. In addition, the measurement may be configured to be performed at the timing of, for example, calibration of the display panel 25 of the display device 20, or the like. In this case, the image processing device 10 or the display device 20 may be configured to upgrade the crosstalk information stored beforehand based on the result of the measurement.

The crosstalk information acquisition unit 15 outputs the acquired crosstalk information of the display device 20 to the light beam deviation detection unit 171.

The light beam deviation detection unit 171 acquires the original image and the parallax map from the image acquisition unit 11. In addition, the light beam deviation detection unit 171 receives notification of the position of the viewer (particularly, the position in the depth direction) with respect to the display panel 25 of the display device 20 from the position information acquisition unit 13. Accordingly, the light beam deviation detection unit 171 can recognize the position of the viewer with respect to the display panel 25. In addition, the light beam deviation detection unit 171 acquires the crosstalk information of the display device 20 from the crosstalk information acquisition unit 15.

Figure 16:
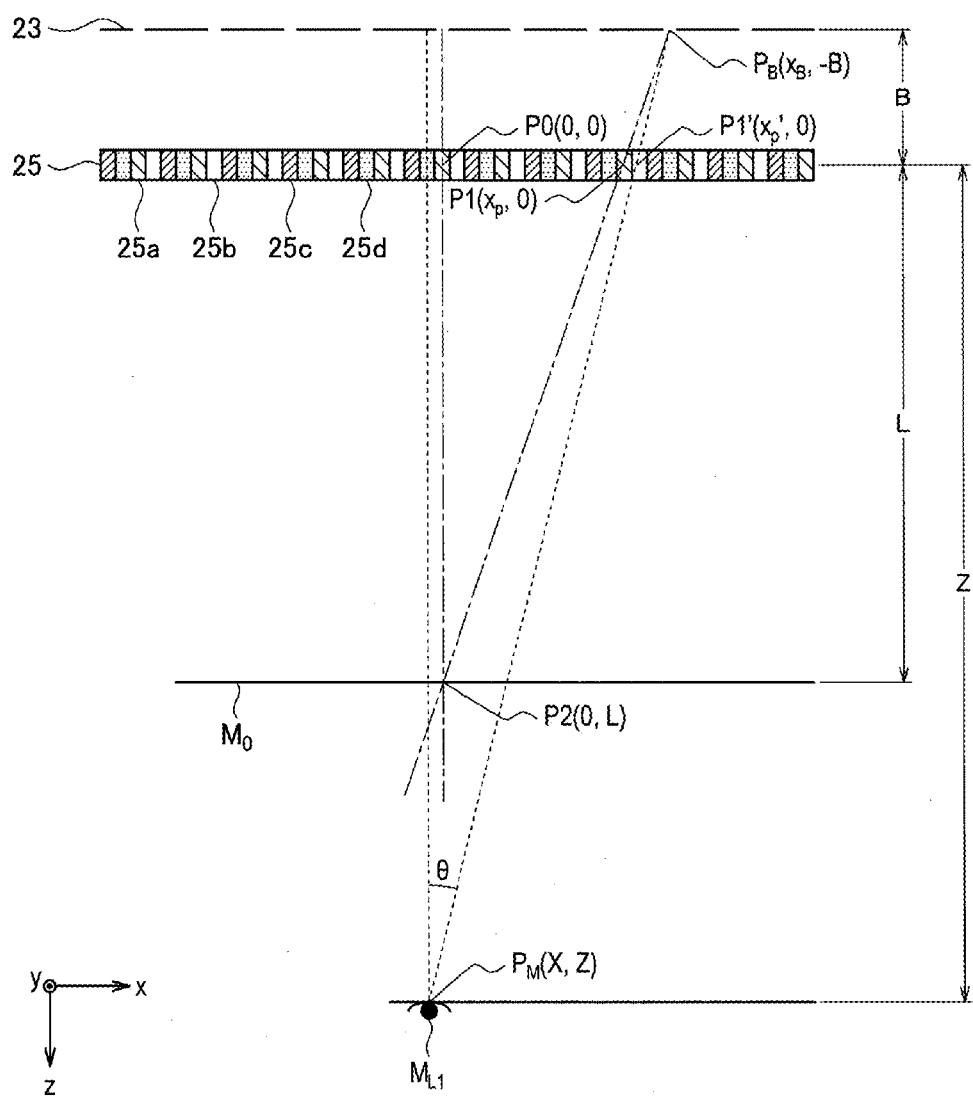
FIG. 16 is a diagram for describing a detailed operation of the image processing device according to the embodiment.

The light beam deviation detection unit 171 computes influence of crosstalk at respective virtual viewpoints which correspond to the position of the viewer (the position in the depth direction) based on the acquired crosstalk information and the recognized position of the viewer with respect to the display panel 25. Hereinbelow, details of a process relating to computation of the influence of crosstalk by the light beam deviation detection unit 171 will be described with reference to FIG. 16. FIG. 16 is a diagram for describing a detailed operation of the image processing device 10 according to the present embodiment, i.e., the detailed process relating to computation of the influence of crosstalk by the light beam deviation detection unit 171.

In FIG. 16, the x direction indicated as the lateral direction represents the horizontal direction with respect to the display panel 25 of the display device 20, and the y direction indicated as the vertical direction with respect to the drawing represents the vertical direction with respect to the display panel 25 of the display device 20. In addition, the z direction indicated as the longitudinal direction represents the depth direction with respect to the display panel 25 of the display device 20. Note that FIG. 16 shows that the position of the display panel 25 is set at the position of z=0, z is set to have negative values in the rearward side of the display panel 25 (the side of the barrier 23), and z is set to have positive values in the frontward side of the display panel 25.

In addition, in FIG. 16, reference symbol B represents the distance between the display panel 25 and the barrier 23 in the z direction. Thus, the z coordinate of the barrier 23 is denoted by z=−B.

Reference symbol $M_0$ represents the optimum viewing position, i.e., a position in the depth direction set in advance with respect to the display panel 25. In addition, reference symbol $M_{L1}$ represents a viewpoint set at a position different from the optimum viewing position $M_0$. Note that, in the present description, the position of the viewpoint $M_{L1}$ will be described as indicating a position of a viewer.

In addition, reference symbol L represents the distance between the optimum viewing position $M_0$ and the display panel 25 in the depth direction. In other words, the z coordinate of the optimum viewing position $M_0$ is indicated as z=L. In addition, reference symbol Z represents the distance between the viewpoint $M_{L1}$ and the display panel 25 in the depth direction. In other words, the z coordinate of the viewpoint $M_{L1}$ is indicated as z=Z.

In addition, in the example shown in FIG. 16, the coordinates corresponding to the optimum viewing position $M_0$ in the frontward side of the position of P0 (0, 0) (pixel) (in other words, the coordinates that are the distance L away from the coordinates P0 in the z direction) are indicated as P2 (0, L). In addition, in the example shown in FIG. 16, the coordinates of the viewpoint $M_{L1}$ set at the position different from the optimum viewing position $M_0$ are indicated as $P_M$ (X, Z).

Here, light emitted from the slit positioned at coordinates $P_B$ ($X_B$, −B) in the frontward side (in the side of the display panel 25) is noted. Here, the coordinates of the pixel of the display panel 25 through which light emitted from the coordinates $P_B$ ($X_B$, −B) penetrates toward the coordinates P2 (0, L) corresponding to the optimum viewing position $M_0$ are set to P1 ($x_p$, 0). Likewise, the coordinates of the pixel of the display panel 25 through which light emitted from the coordinates $P_B$ ($X_B$, −B) penetrates toward the coordinates $P_M$ (X, Z) corresponding to the viewpoint $M_{L1}$ are set to P1' ($x_p'$, 0).

In this case, when the angle of light that is emitted from the coordinates $P_B$ ($X_B$, −B) and then penetrates the coordinates P1' ($x_p'$, 0) with respect to the z axis on the x-z plane is set to θ, the angle θ can be computed based on (Formula 1) and (Formula 2) shown below.

$$\theta = \tan^{-1}\left(\frac{x_B - X}{Z + B}\right) \quad \text{(Formula 1)}$$

$$x_B = \frac{L + B}{L} x_p \quad \text{(Formula 2)}$$

Note that the distance L can be computed based on the position of the viewer notified of by the position information acquisition unit 13.

In addition, the angle θ corresponds to the direction from the coordinates P1' ($x_p'$, 0) toward the coordinates $P_M$ (X, Z) (i.e., the viewpoint $M_{L1}$). For this reason, it is possible to compute the degree of intensity of light reaching coordinates $P_M$ (X, Z) from the coordinates P1' ($x_p'$, 0), i.e., the index of a light beam output from the pixel located at the coordinates P1' ($x_p'$, 0) from the angle θ and the crosstalk information of the display device 20.

Here, when the index of a pixel corresponding to the coordinates (x, y) of a $k^{th}$ viewpoint on the index map when the position of the viewer is the optimum viewing position $M_0$ is set to $i_k$ (x, y), the index $i_k$ (x, y) is expressed by (Formula 3) shown below.

$$i_k(x,y) = k \quad \text{(Formula 3)}$$

In addition, the index of the light beam emitted from the pixel located at P1' ($x_p'$, 0) is set to i'$_k$ (x, y). In this case, the index i'$_k$ (x, y) can be expressed by (Formula 4) as below with the index $i_k$ (x, y) that is based on the optimum viewing position $M_0$ of the pixel, an angle $\theta_k$ (X, Z) defined by the viewing position $P_M$ (X, Z) and the viewpoint k, the number of virtual viewpoints N, and the intensity of a leaked light beam at all viewpoints m $E_m$ ($\theta_k$ (X, Z)).

$$i'_k(x, y) = \sum_{m=1}^{N} i_k(x, y) E_m(\theta_k(X, Z)) \quad \text{(Formula 4)}$$

Using the characteristics described above, the light beam deviation detection unit 171 computes indexes (in other words, viewpoint images) observed as the respective virtual viewpoints with the influence of crosstalk added thereto based on the acquired crosstalk information and the position of the viewer with respect to the display panel 25. At that time, for example, the computation results as shown in FIG. 6 are obtained. Note that the example shown in FIG. 6 includes only data showing one virtual viewpoint as described above, and the light beam deviation detection unit 171 generates data as shown in FIG. 6 for the respective virtual viewpoints. Note that data indicating indexes computed with the influence of crosstalk added thereto and observed at the respective virtual viewpoints may be referred to hereinafter as a "crosstalk analysis result."

The light beam deviation detection unit 171 outputs the computed crosstalk analysis result, the original image, and the parallax map to the light beam deviation correction unit 173.

The light beam deviation correction unit 173 generates an index map according to the position of the viewer based on the index map defined beforehand according to the optimum viewing position $M_0$. Note that the index map based on the optimum viewing position $M_0$ may be stored in advance at a location from which it can be read out by the light beam deviation correction unit 173 and the image generation unit 175 to be described later. The index map based on the optimum viewing position $M_0$ can be defined based on, for example, the rendering rule shown in FIG. 4. Hereinbelow, a detailed operation of the light beam deviation correction unit 173 will be described.

The light beam deviation correction unit 173 acquires the crosstalk analysis result, the original image, and the parallax map from the light beam deviation detection unit 171.

The light beam deviation correction unit 173 sets a rendering rule so as to negate the influence of crosstalk and to cause only a predetermined index viewpoint image to be observed at the respective virtual viewpoints (in other words, so as to cancel a deviation of the indexes) based on the acquired crosstalk analysis result.

To be specific, when a corrected index (of which a deviation has been cancelled) is set to $j_k$ (x, y), the index $j_k$ (x, y) is expressed by (Formula 5) shown below based on the above-described (Formula 3) and (Formula 4).

$$j_k(x,y) = i_k(x,y) - \{i'_k(x,y) - i_k(x,y)\} = 2i_k(x,y) - i'_k(x,y) \quad \text{(Formula 5)}$$

Note that, in (Formula 5), $i_k$ (x, y) is equivalent to the index of any viewpoint (for example, the viewpoint v4) out of the indexes shown in FIG. 4, and i'$_k$ (x, y) is equivalent to the index actually observed at the viewpoint shown in FIG. 6. For this reason, based on (Formula 5), each index is distributed such that the distribution of the index shown in FIG. 6 is turned upside down and side to side at each viewpoint as the index $j_k$ (x, y).

In other words, the light beam deviation correction unit 173 sets the rendering rule based on (Formula 3) to (Formula 5) so that each index $i_k$ (x, y) corresponding to each pixel of the index map based on the optimum viewing position $M_0$ is converted into the index $j_k$ (x, y) of which a deviation is cancelled. For example, the rendering rule shown in FIG. 11 is set by the light beam deviation correction unit 173.

In addition, the light beam deviation correction unit 173 converts each index associated with each pixel of the index map based on the optimum viewing position $M_0$ into the index computed based on the set rendering rule. Accordingly, respective indexes of the index map based on the optimum viewing position $M_0$ stored in advance are converted into indexes according to the detected position of the viewer, and thereby the index map in accordance with the position of the viewer is generated.

Note that it is needless to say that the light beam deviation correction unit 173 may not necessarily perform the setting of the rendering rule and the conversion of the index map when the detected position of the viewer corresponds to the optimum viewing position $M_0$.

The light beam deviation correction unit 173 outputs the generated index map based on the position of the viewer, the original image, and the parallax map to the image generation unit 175.

The image generation unit 175 acquires the index map based on the position of the viewer, the original image, and the parallax map from the light beam deviation correction unit 173.

The image generation unit 175 generates viewpoint images corresponding to the respective indexes included in the index map based on the acquired index map based on the position of the viewer, the original image, and the parallax map.

At this time, for example, the image generation unit 175 preliminarily generates viewpoint images corresponding to the indexes based on the index map that is defined beforehand based on the optimum viewing position $M_0$, the acquired original image, and the parallax map. Accordingly, when there are 9 set virtual viewpoints, for example, the viewpoint images each corresponding to the respective virtual viewpoint, i.e., 9 viewpoint images, are preliminarily generated.

After the viewpoint images are preliminarily generated based on the index map defined based on the optimum viewing position $M_0$, the image generation unit 175 combines the preliminarily generated respective viewpoint images, and thereby generates the viewpoint images corresponding to the respective indexes of the index map based on the acquired position of the viewer.

Of course, based on the index map defined based on the position of the viewer, the original image, and the parallax map, the image generation unit 175 may directly generate the viewpoint images corresponding to the respective indexes of the index map. In this case, the image generation unit 175 may acquire (or compute), for example, pixel values based on the values of the respective indexes and thereby generate the respective viewpoint images based on the acquired pixel values.

In addition, the image generation unit 175 generates the viewpoint images with regard to some indexes among the indexes of the index map based on the position of the viewer, and for the other ones, images may be generated by combining the viewpoint images that have been generated for the some indexes.

The image generation unit 175 generates a multiple-viewpoint image in which images corresponding to the indexes set for respective pixels are displayed based on the viewpoint images generated based on the index map defined based on the position of the viewer.

Note that, although the example in which the respective viewpoint images are generated and the multiple-viewpoint image is generated based on the generated viewpoint images has been described above for ease of understanding of the description, the image generation unit 175 may directly generate the multiple-viewpoint image based on the index map, the original image, and the parallax map.

In this case, the image generation unit 175 may compute the pixel values of respective pixels of the multiple-viewpoint image based on indexes set for the pixels. In addition, the image generation unit 175 computes the pixel values of some pixels based on the index map, the original image, and the parallax map, and may compute the pixel values of the other pixels based on indexes of the other pixels by combining the computed pixel values of the some pixels.

The image generation unit 175 outputs the generated multiple-viewpoint image to the display device 20. Accordingly, the generated multiple-viewpoint image is displayed on the display panel 25 of the display device 20.

[4.3. Process Flow]

Figure 17:
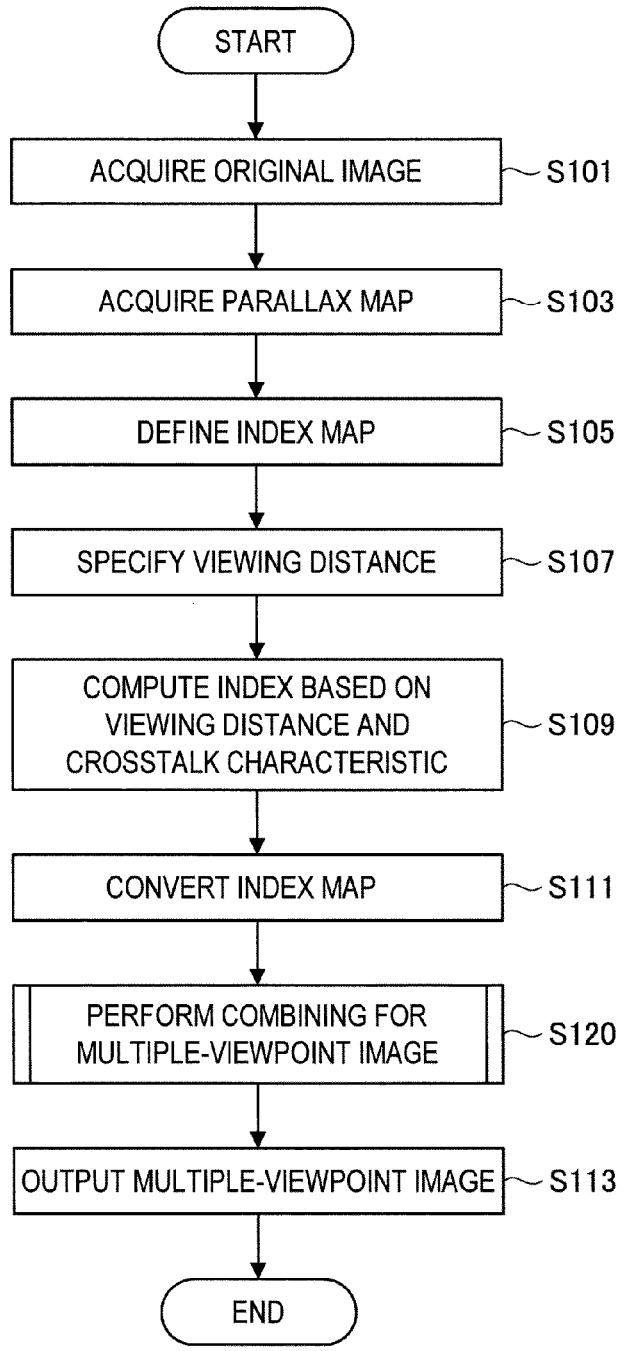
FIG. 17 is a flowchart for describing the flow of a series of processes of the image processing device according to the embodiment.

Next, the flow of a series of processes of the image processing device 10 according to the present embodiment will be described with reference to FIG. 17. FIG. 17 is a flowchart for describing the flow of the series of processes of the image processing device according to the present embodiment.

(Step S101)

First, the image acquisition unit 11 externally acquires an original image that is a source for generating each viewpoint image to be displayed by the display device 20. Note that the image acquisition unit 11 may receive an original image distributed as broadcasting, through the antenna 30, or read out an original image stored in an external medium from the external medium.

(Step S103)

Then, the image acquisition unit 11 acquires a parallax map indicating distribution of parallaxes between different viewpoint images that are set for pixels in the original image. Here, the image acquisition unit 11 may externally acquire the parallax map, similarly to the original image. As another example, the image acquisition unit 11 may analyze the acquired original image and generate the parallax map based on the analysis result.

The image acquisition unit 11 outputs the acquired original image and parallax map to the light beam deviation detection unit 171.

(Step S105)

In addition, the image processing device 10 stores the index map defined beforehand based on the optimum viewing position $M_0$ at a location from which it can be read out by the light beam deviation correction unit 173 and the image generation unit 175.

(Step S107)

The position information acquisition unit 13 acquires position information of a viewer from, for example, the viewing position detection device 40 (see FIG. 1). The position information acquisition unit 13 specifies the position of the viewer (particularly, the position in the depth direction) with respect to the display panel 25 of the display device 20 based on the acquired position information, and notifies the light beam deviation detection unit 171 of the specified position of the viewer. Accordingly, the light beam deviation detection unit 171 can recognize the position of the viewer with respect to the display panel 25.

(Step S109)

The crosstalk information acquisition unit 15 acquires crosstalk information of the display device 20. Note that the crosstalk information may be generated in advance based on, for example, the configuration of the display device 20 as described above, and stored at a location from which it can be read out by the crosstalk information acquisition unit 15 (for example, a storage unit inside the image processing device 10 or the display device 20).

The crosstalk information acquisition unit 15 outputs the acquired crosstalk information of the display device 20 to the light beam deviation detection unit 171.

The light beam deviation detection unit 171 acquires the original image and the parallax map from the image acquisition unit 11. In addition, the light beam deviation detection unit 171 receives notification of the position of the viewer (particularly, the position in the depth direction) with respect to the display panel 25 of the display device 20 from the position information acquisition unit 13. Accordingly, the light beam deviation detection unit 171 can recognize the position of the viewer with respect to the display panel 25. Further, the light beam deviation detection unit 171 acquires the crosstalk information of the display device 20 from the crosstalk information acquisition unit 15.

The light beam deviation detection unit 171 computes influence of crosstalk at respective virtual viewpoints corresponding to the position of the viewer (the position in the depth direction) based on the acquired crosstalk information and the recognized position of the viewer with respect to the display panel 25. Then, the light beam deviation detection unit 171 computes indexes (in other words, viewpoint images) observed at the respective virtual viewpoints with the computed influence of crosstalk added thereto.

The light beam deviation detection unit 171 outputs data indicating the indexes (i.e., a crosstalk analysis result) observed at the respective virtual viewpoints computed with influence of crosstalk added thereto, the original image, and the parallax map to the light beam deviation correction unit 173.

(Step S111)

The light beam deviation correction unit 173 acquires the crosstalk analysis result, the original image, and the parallax map from the light beam deviation detection unit 171.

The light beam deviation correction unit 173 negates the influence of crosstalk based on the acquired crosstalk analysis result, and sets a rendering rule so that only a predetermined index viewpoint image is observed at the respective virtual viewpoints (in other words, so that a deviation of the indexes is cancelled).

Then, the light beam deviation correction unit 173 converts the indexes associated with respective pixels on the index map that is based on the optimum viewing position $M_0$ into indexes computed based on the set rendering rule. Accordingly, the index map that is stored in advance based on the optimum viewing position $M_0$ is converted into the index map according to the detected position of the viewer. In other words, the light beam deviation correction unit 173 generates the index map according to the detected position of the viewer.

Note that it is needless to say that, when the detected position of the viewer corresponds to the optimum viewing position $M_0$, the light beam deviation correction unit 173 may not necessarily perform the setting of the rendering rule and the conversion of the index map.

The light beam deviation correction unit 173 outputs the generated index map that is based on the position of the viewer, the original image, and the parallax map to the image generation unit 175.

(Step S120)

Based on the acquired index map that is based on the position of the viewer, the original image, and the parallax map, the image generation unit 175 generates viewpoint images each corresponding to the indexes included in the index map. Then, the image generation unit 175 generates a multiple-viewpoint image in which images corresponding to the indexes set for each pixel are displayed based on the respective viewpoint images generated based on the index map that is defined based on the position of the viewer.

Figure 18:
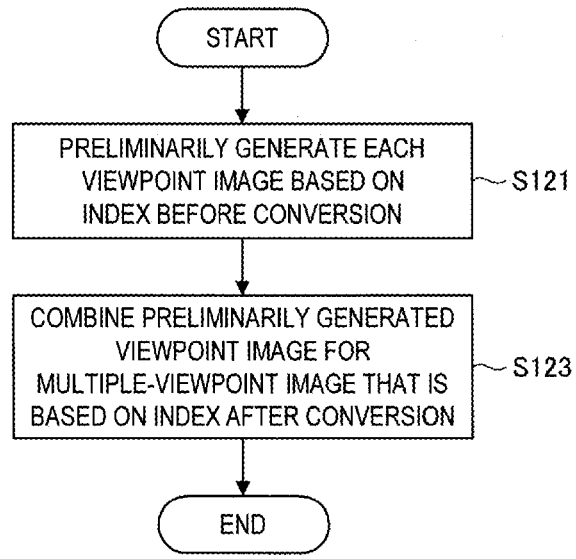
FIG. 18 is a flowchart showing an example of a process relating to generation of a multiple-viewpoint image.

Here, an example of the operation of the image generation unit 175 will be described in detail with reference to FIG. 18. FIG. 18 is a flowchart showing the example of the process performed by the image generation unit 175 relating to generation of the multiple-viewpoint image.

(Step S121)

For example, the image generation unit 175 preliminarily generates viewpoint images corresponding to the respective indexes based on the index map defined beforehand based on the optimum viewing position $M_0$, and the acquired original image and the parallax map. Accordingly, when there are 9 virtual viewpoints set, for example, the viewpoint images each corresponding to the virtual viewpoints, i.e., 9 viewpoint images, are preliminarily generated.

(Step S123)

After the viewpoint images are preliminarily generated based on the index map defined based on the optimum viewing position $M_0$, the image generation unit 175 combines the preliminarily generated respective viewpoint images, and thereby generates the viewpoint images corresponding to the respective indexes of the index map that is based on the acquired position of the viewer.

Then, the image generation unit 175 combines the respective viewpoint images generated based on the index map based on the position of the viewer thereby generating the multiple-viewpoint image in which images corresponding to the indexes set for respective pixels are displayed. Accordingly, the multiple-viewpoint image that is based on the index map defined based on the position of the viewer is generated.

In addition, a method of generating a multiple-viewpoint image is not limited to the above-described method with respect to FIG. 18. For example, FIG. 19 is a flowchart showing an example of a process performed by the image generation unit 175 relating to generation of a multiple-viewpoint image.

(Step S125)

Figure 19:
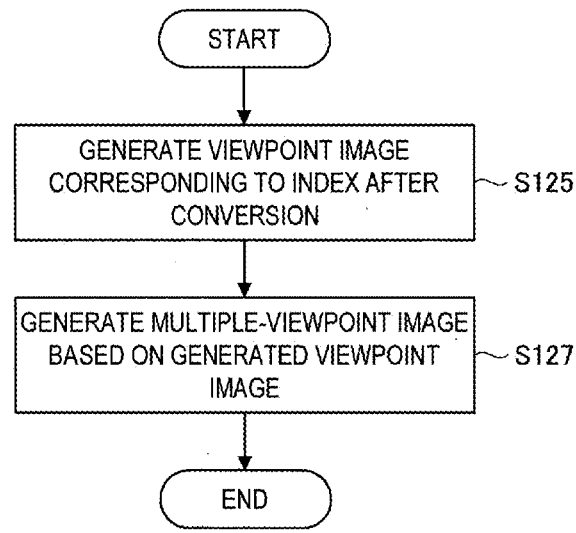
FIG. 19 is a flowchart showing an example of a process relating to generation of a multiple-viewpoint image.

In the example shown in FIG. 19, the image generation unit 175 directly generates the viewpoint images corresponding to the respective indexes of the index map based on the index map defined based on the position of the viewer, the original image, and the parallax map. In this case, for example, the image generation unit 175 may acquire (or compute) pixel values based on the values of the indexes, and generate the respective viewpoint images based on the acquired pixel values.

(Step S127)

The image generation unit 175 generates the multiple-viewpoint images in which images corresponding to the indexes set for the respective pixels are displayed based on the respective viewpoint image generated based on the index map defined based on the position of the viewer.

Note that, although the example in which the respective viewpoint images are generated and then the multiple-viewpoint images are generated based on the generated viewpoint image has been described above for ease of understanding of description, the image generation unit 175 may directly generate the multiple-viewpoint image based on the index map, the original image, and the parallax map.

In this case, the pixel values of the respective pixels of the multiple-viewpoint image may be computed based on the indexes set for the pixels. In addition, in this case, the image generation unit 175 may compute the pixel values of some pixels based on the index map, the original image, and the parallax map, and the pixel values of the other pixels may be computed by combining the computed pixel values of the some pixels based on the indexes of the other pixels.

(Step S113)

Here, FIG. 17 will be referred to again. The image generation unit 175 outputs the generated multiple-viewpoint image to the display device 20. Accordingly, the generated multiple-viewpoint image is displayed on the display panel 25 of the display device 20.

[4.4. Conclusion]

As described above, the image processing device 10 according to the present embodiment generates indexes so as to negate influence of crosstalk according to a position of a viewer based on position information indicating the position of the viewer and crosstalk information of the display device 20, and associates the indexes with respective pixels. Then, the image processing device 10 generates viewpoint images corresponding to the generated respective indexes, and causes the generated viewpoint images to be displayed in pixels associated with the indexes that correspond to the viewpoint images. With this configuration, even when the viewer is located at a position different from the optimum viewing position $M_O$, the image processing device 10 according to the present embodiment can suppress occurrence of blur or a double image caused by a deviation of observed viewpoint images (a deviation of the indexes).

<5. Modified Example>

[5.1. Overview]

Next, an image processing device 10a according to a modified example will be described. The display device 20 such as a so-called glasses-free 3D display forms one normal area by arranging a plurality of virtual viewpoints at which viewpoint images each having different parallax are observed. For example, when there are 9 set virtual viewpoints denoted by v0 to v8, one such normal region is formed by lining the virtual viewpoints v0 to v8 in the horizontal direction with respect to the display panel 25. Then, there are cases in which viewpoint images periodically appear as a plurality of normal regions are repeatedly arranged in the horizontal direction with respect to the display panel 25.

On the other hand, there are cases in which a reversed vision phenomenon occurs when viewpoint images are respectively input in adjacent different normal regions for the right and left eyes of a user, such as when the user moves his or her head in the horizontal direction with respect to the display panel 25. As a specific example, between adjacent normal regions, the virtual viewpoint v8 of one normal region and the virtual viewpoint v0 of the other normal region are adjacent. There are many cases in which a viewpoint image corresponding to the virtual viewpoint v0 and a viewpoint image corresponding to the virtual viewpoint v8 observed in the setting have a great difference between parallax values, and thus a viewer may observe the images as distortion of his or her viewpoint.

Thus, in the image processing device 10a according to the modified example, an index map according to a position of a viewer generated by the light beam deviation correction unit 173 is further converted so that, for example, a parallax value that the viewpoint images corresponding to the adjacent respective virtual viewpoints have is equal to or smaller than a predetermined threshold value. Then, by generating a multiple-viewpoint image based on the converted index map, the image processing device 10a reduces occurrence of distortion of a viewpoint caused by the reversed vision phenomenon, or the like. Hereinbelow, the image processing device 10a according to the modified example will be described in more detail.

[5.2. Configuration]

Figure 20:
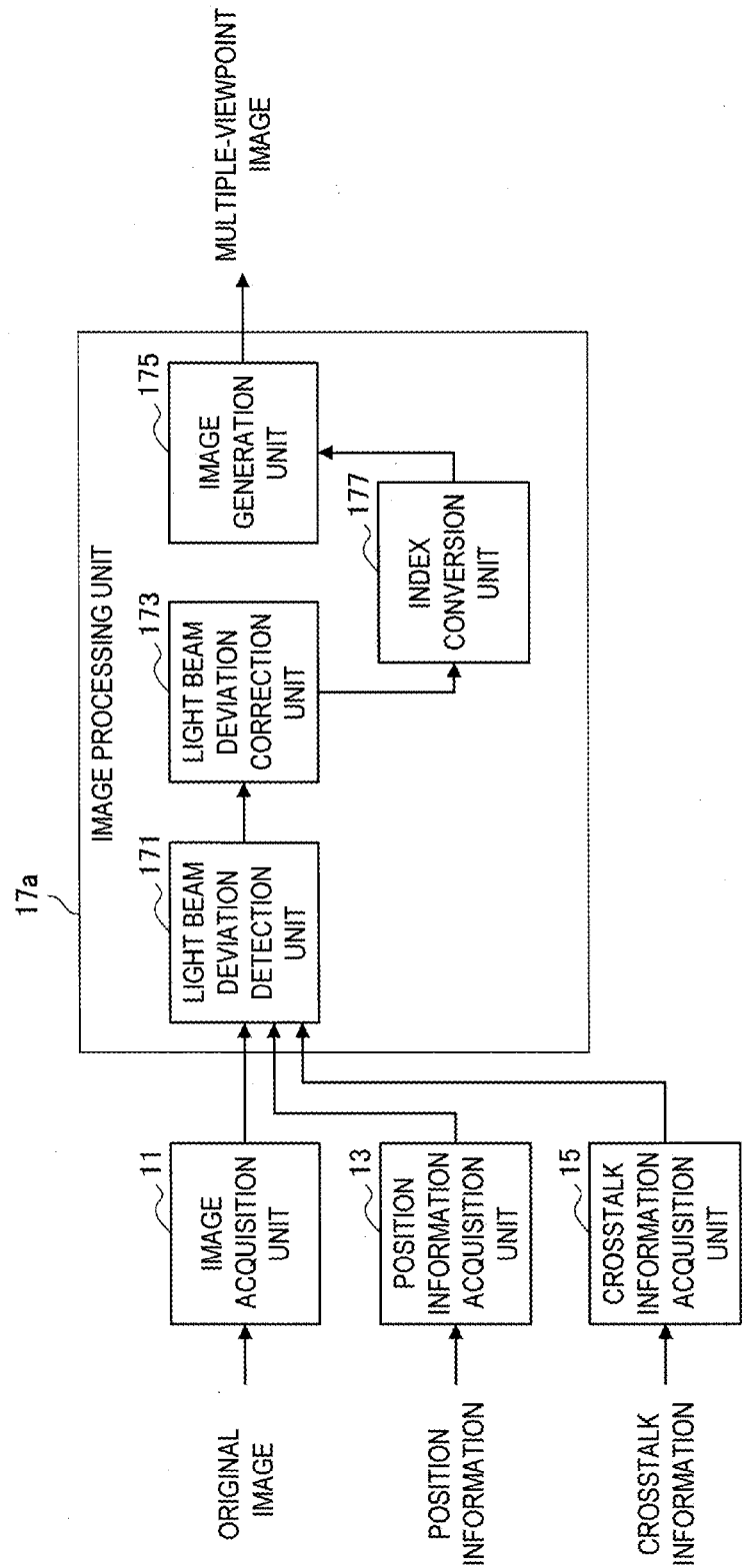
FIG. 20 is a block diagram showing an example of a functional configuration of an image processing device according to a modified example.

A configuration of the image processing device 10a according to the modified example will be described with reference to FIG. 20. As shown in FIG. 20, the image processing device 10a according to the modified example includes the image acquisition unit 11, the position information acquisition unit 13, the crosstalk information acquisition unit 15, and an image processing unit 17a.

Note that, since operations of the image acquisition unit 11, the position information acquisition unit 13, and the crosstalk information acquisition unit 15 are the same as those of the image processing device 10 according to the embodiment described above (see FIG. 15), detailed description thereof will be omitted.

In addition, the image processing device is different from the image processing device 10 according to the above-described embodiment in that the image processing unit 17a includes an index conversion unit 177. For this reason, hereinbelow, description will be provided focusing on differences of the image processing unit 17a from the image processing unit 17 of the image processing device 10 according to the above-described embodiment, and detailed description with respect to other configurations will be omitted.

The light beam deviation detection unit 171 computes indexes observed at respective virtual viewpoints (in other words, viewpoint images) with influence of crosstalk added thereto based on crosstalk information and a position of a viewer with respect to the display panel 25.

The light beam deviation detection unit 171 outputs data indicating the indexes observed at the respective virtual viewpoints computed with the influence of crosstalk added thereto (i.e., a crosstalk analysis result), an original image, and a parallax map to the light beam deviation correction unit 173.

The light beam deviation correction unit 173 acquires the crosstalk analysis result, the original image, and the parallax map from the light beam deviation detection unit 171.

The light beam deviation correction unit 173 negates the influence of crosstalk based on the acquired crosstalk analysis result, and sets a rendering rule so that only a predetermined index viewpoint image is observed at the respective virtual viewpoints (in other words, so that the deviation of the indexes is cancelled).

Then, the light beam deviation correction unit 173 converts the indexes associated with respective pixels based on an index map defined based on the optimum viewing position $M_O$ into indexes computed based on the set rendering rule. Accordingly, the index map defined based on the optimum viewing position $M_O$ stored in advance is converted into the index map according to the detected position of the viewer. In other words, the light beam deviation correction unit 173 generates the index map according to the detected position of the viewer. The processes performed until then are the same as those performed by the image processing unit 17 of the image processing device 10 according to the above-described embodiment.

The light beam deviation correction unit 173 outputs the index map generated based on the position of the viewer, the original image, and the parallax map to the index conversion unit 177.

The index conversion unit 177 acquires the index map based on the position of the viewer, the original image, and the parallax map from the light beam deviation correction unit 173.

The index conversion unit 177 converts the indexes corresponding to the respective pixels indicated on the acquired index map so that a difference between viewpoint images observed at respective virtual viewpoints is equal to or smaller than a threshold value. As a specific example, the index conversion unit 177 converts the indexes corresponding to the respective pixels indicated on the acquired index map so that the difference between indexes corresponding to adjacent respective pixels is equal to or smaller than the threshold value.

Here, the index of a pixel at coordinates (x, y) corresponding to a viewpoint k indicated on the acquired index map is set to $j_k$ (x, y), and the index obtained when the index conversion unit 177 converts the index $j_k$ (x, y) is set to $j'_k$ (x, y). In this case, the index conversion unit 177 converts the index $j_k$ (x, y) based on the acquired index map based on (Formula 6) and (Formula 7) shown below.

$$j'_k(x, y) = \begin{cases} j_k(x, y) & (j_k(x, y) \le H) \\ H - \dfrac{H}{N-H}(j_k(x, y) - H) & (j_k(x, y) > H) \end{cases} \quad \text{(Formula 6)}$$

$$H = \left\lceil \dfrac{N}{2} \right\rceil \quad \text{(Formula 7)}$$

Figure 21:
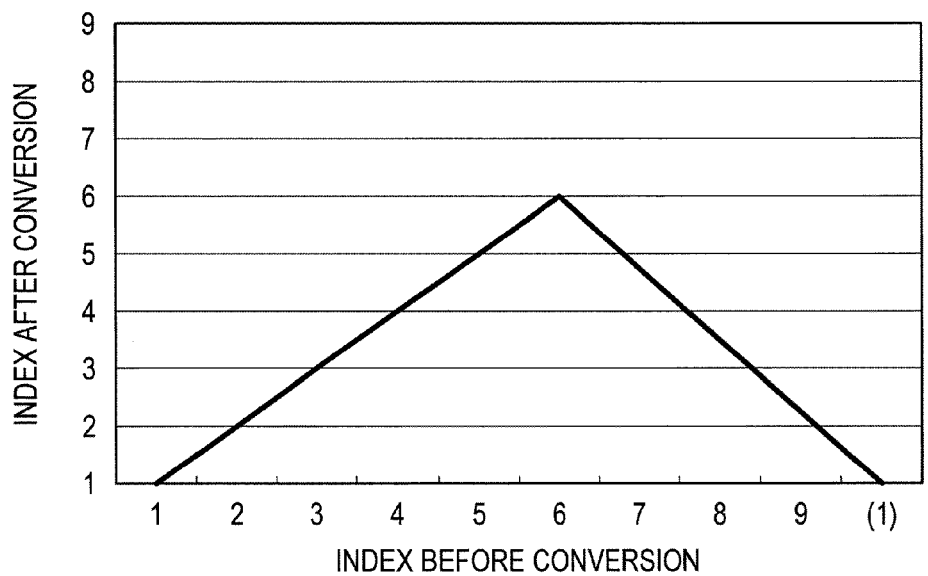
FIG. 21 is a diagram schematically showing an example of a rule of index conversion.

FIG. 21 is a diagram schematically showing an example of a rule of index conversion, showing the conversion rule that is based on the above-described (Formula 6) and (Formula 7). The horizontal axis of FIG. 21 represents indexes $j_k$ (x, y) before conversion, i.e., based on the acquired index map. In addition, the vertical axis represents indexes $j'_k$ (x, y) after conversion. In other words, FIG. 21 shows a correspondence between the indexes $j_k$ (x, y) before conversion and the indexes $j'_k$ (x, y) after conversion when the indexes are converted based on the above-described (Formula 6) and (Formula 7). Note that, in the example shown in FIG. 21, 9 virtual viewpoints are set and 1 to 9 are set as the values of the indexes.

As shown in FIG. 21, by converting the indexes, it is possible to prevent observation of viewpoint images each having a high parallax value (for example, occurrence of the reversed vision phenomenon), for example, viewpoint images corresponding to the respective virtual viewpoints v8 to v0 based on the index map before conversion.

Note that the rule of the index conversion shown by (Formula 6), (Formula 7), and FIG. 21 are merely examples, and the rule is not particularly limited as long as it enables conversion so that the difference between viewpoint images observed at adjacent virtual viewpoints is equal to or smaller than a threshold value.

The index conversion unit 177 outputs the index map of which the indexes have been converted, the original image, and the parallax map to the image generation unit 175 based on the above-described rule of the index conversion. Note that following processes are the same as those of the image processing unit 17 of the image processing device 10 according to the above-described embodiment. In other words, the image generation unit 175 generates a multiple-viewpoint image based on the index map, the original image, and the parallax map acquired from the index conversion unit 177, and causes the generated multiple-viewpoint image to be displayed on the display device 20.

[5.3. Process Flow]

Figure 22:
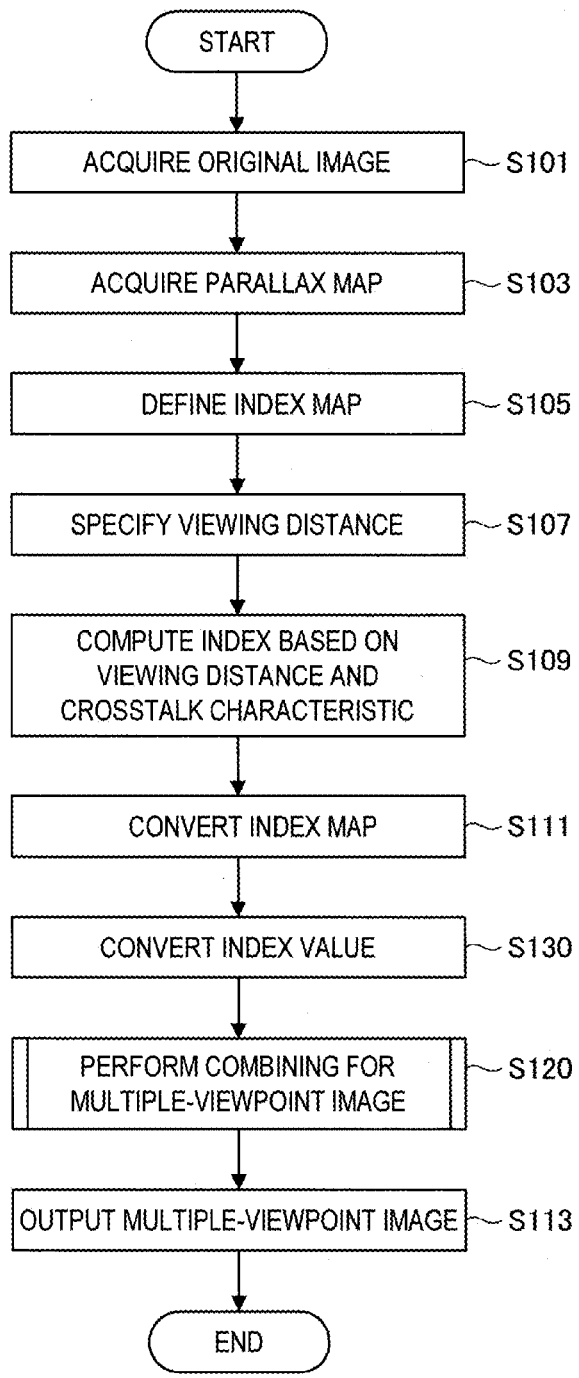
FIG. 22 is a flowchart for describing the flow of a series of processes of the image processing device according to the modified example.

Next, an operation of the image processing device 10a according to the modified example will be described with reference to FIG. 22. FIG. 22 is a flowchart for describing the flow of a series of processes of the image processing device 10a according to the modified example. Note that the image processing device 10a according to the modified example is different from the image processing device 10 according to the above-described embodiment in that a process relating to Step S130 is added. For this reason, the description will focus on the process relating to Step S130, and detailed description with respect to the same processes as those of the image processing device 10 according to the above-described embodiment will be omitted.

(Steps S101 to S109)

The light beam deviation detection unit 171 computes indexes (in other words, viewpoint images) observed at respective virtual viewpoints with influence of crosstalk added thereto based on crosstalk information and a position of a viewer with respect to the display panel 25.

The light beam deviation detection unit 171 outputs data indicating the indexes observed at the respective virtual viewpoints computed with the influence of crosstalk added thereto (in other words, a crosstalk analysis result), an original image, and a parallax map to the light beam deviation correction unit 173.

(Step S111)

The light beam deviation correction unit 173 acquires the crosstalk analysis result, the original image, and the parallax map from the light beam deviation detection unit 171.

The light beam deviation correction unit 173 negates the influence of crosstalk based on the acquired crosstalk analysis result, and then sets a rendering rule so that only a predetermined index viewpoint image is observed at each virtual viewpoint (so that a deviation of the indexes is cancelled).

Then, the light beam deviation correction unit 173 converts indexes associated with respective pixels on the index map defined based on the optimum viewing position $M_0$ into indexes computed based on the set rendering rule. Accordingly, the index map defined based on the optimum viewing position $M_0$ stored in advance is converted into the index map according to a detected position of a viewer. In other words, the light beam deviation correction unit 173 generates the index map according to the detected position of the viewer. The processes performed until then are the same as those of the image processing unit 17 of the image processing device 10 according to the above-described embodiment.

The light beam deviation correction unit 173 outputs the index map generated based on the position of the viewer, the original image, and the parallax map to the index conversion unit 177.

(Step S130)

The index conversion unit 177 acquires the index map based on the position of the viewer, the original image, and the parallax map from the light beam deviation correction unit 173.

The index conversion unit 177 performs conversion so that the difference of each index corresponding to each pixel indicated on the acquired index map and each index corresponding to its adjacent pixel is less than a predetermined threshold value, based on the rule of index conversion decided in advance. For example, FIG. 21 shows an example of the rule of index conversion.

The index conversion unit 177 outputs an index map of which the indexes have been converted based on the above-described rule of index conversion, the original image, and the parallax map to the image generation unit 175.

Note that the process of Step S120 and the following process are the same as those of the image processing unit 17 (of FIGS. 17 to 19) of the image processing device 10 according to the above-described embodiment. In other words, the image generation unit 175 generates a multiple-viewpoint image based on the index map acquired from the index conversion unit 177, the original image, and the parallax map, and causes the generated multiple-viewpoint image to be displayed on the display device 20.

[5.4. Conclusion]

As described above, the image processing device 10a according to the modified example converts the indexes corresponding to the respective pixels on the index map defined based on a position of a viewer so that the difference of viewpoint images each observed at adjacent virtual viewpoints is equal to or smaller than the threshold value. With this configuration, the image processing device 10a according to the modified example can prevent observation of viewpoint images each having a high parallax value such as viewpoint images corresponding to the respective virtual viewpoints v8 to v0 based on the index map before conversion. In other words, the image processing device 10a can reduce occurrence of distortion of a viewpoint caused by, for example, the reversed vision phenomenon, or the like.

<6. Hardware Configuration>

Figure 23:
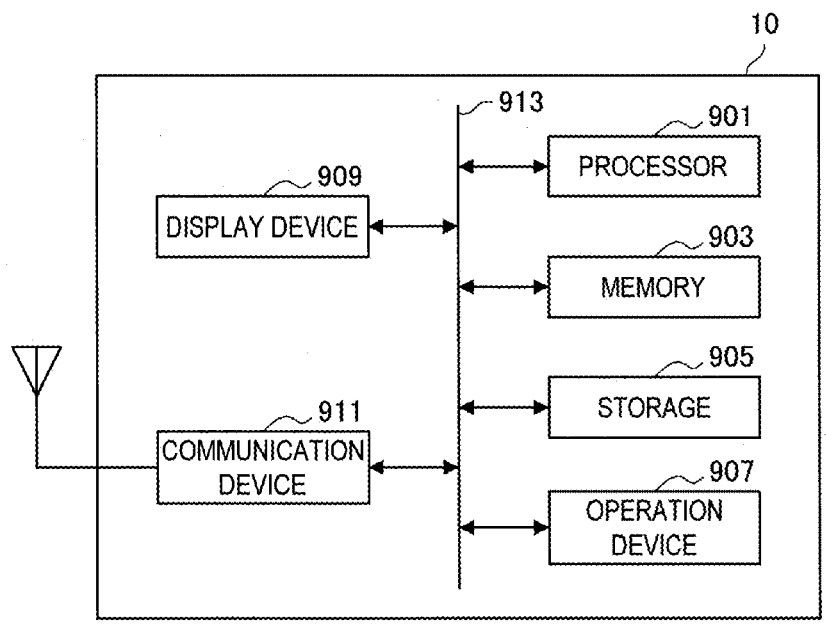
FIG. 23 is a diagram showing an example of a hardware configuration.

Next, an example of a hardware configuration of the image processing device 10 according to the embodiment will be described with reference to FIG. 23. FIG. 23 is a diagram illustrating an example of a hardware configuration of the image processing device 10 according to the embodiment.

As illustrated in FIG. 23, the image processing device 10 according to the embodiment includes a processor 901, a memory 903, a storage 905, an operation device 907, a display device 909, a communication device 911, and a bus 913.

The processor 901 may be a central processing unit (CPU), a graphics processing unit (GPU), a digital signal processor (DSP), or a system on chip (SoC), for example, and executes various kinds of processing of the image processing device 10. The processor 901 can be configured by an electronic circuit for executing various kinds of arithmetic processing, for example. Note that the image acquisition unit 11, the position information acquisition unit 13, the crosstalk information acquisition unit 15, and the image processing unit 17, which are described above, can be configured by the processor 901.

The memory 903 includes a random access memory (RAM) and a read only memory (ROM), and stores programs and data executed by the processor 901. The storage 905 may include a storage medium such as a semiconductor memory or a hard disk.

The operation device 907 has a function of generating input signals for desired operation by a user. The operation device 907 may include an input unit for input of information by a user, such as a button and a switch, for example, and an input control circuit for generating input signals based on an input of a user and supplying the input signals to the processor 901.

The display device 909 is an example of an output device, and may be a display device such as a liquid crystal display (LCD) device and an organic light emitting diode (OLED) display device. The display device 909 can provide information by displaying a screen to a user. Note that the above-described display device 20 may be configured as the display device 909, or the display device 909 may be provided separately from the display device 20.

The communication device 911 is a communication device included in the image processing device 10, and performs communication with an external device through a network. The communication device 911 is an interface for wireless communication, and may include a communication antenna, a radio frequency (RF) circuit, and a base band processor, for example.

The communication device 911 has a function of performing various kinds of signal processing on signals received from an external device, and can provide digital signals generated based on received analog signals to the processor 901.

The bus 913 mutually connects the processor 901, the memory 903, the storage 905, the operation device 907, the display device 909, and the communication device 911. The bus 913 may include a plurality of kinds of buses.

Moreover, it is possible to generate a program for causing hardware such as a CPU, a ROM, and a RAM included in a computer to exert the same functions as the components of the image processing device 10 described above. In addition, it is also possible to provide a computer-readable storage medium having the program therein.

<7. Application Examples>

The following will describe application examples of the above-described image processing device according to the embodiment with the use of concrete examples.

Figure 24:
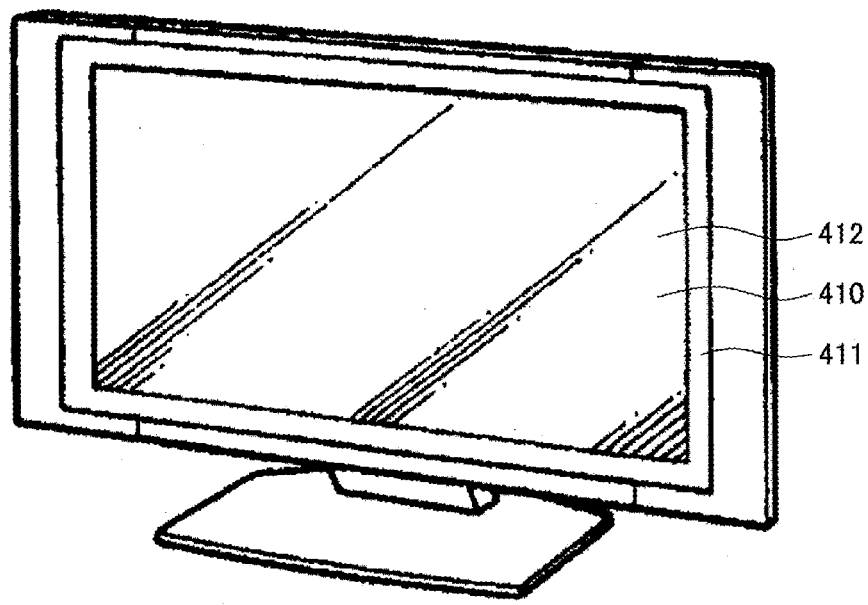
FIG. 24 is a perspective view showing the exterior of an application example of the image processing device (a television device) according to the embodiment.

For example, FIG. 24 illustrates an exterior configuration of a television device. This television device is equipped with, for example, a video display screen unit 410 (the display device 20) that includes a front panel 411 and a filter glass 412. Note that a device relating to displaying of images on the video display screen unit 410 provided inside the housing of the television device (for example, a processor such as a CPU or a GPU) is equivalent to the image processing device 10 according to the above-described embodiment. By using the display device according to an embodiment of the present disclosure as the television device, even when a viewer is located at a position different from an optimum viewing position, it is possible to suppress occurrence of blur or a double image caused by a deviation of observed viewpoint images, which can improve television devices.

In addition, the image processing device 10 according to the present embodiment can be applied to, for example, a tablet terminal. In this case, a device relating to displaying of images on a display screen unit of the tablet terminal provided in the housing of the tablet terminal (for example, a processor such as a CPU or a GPU) is equivalent to the image processing device 10 according to the above-described embodiment. By using the display device according to an embodiment of the present disclosure as the tablet device, it is possible to suppress a feeling of fatigue of a viewer caused by occurrence of blur or double images, which can improve tablet terminals.

It is needless to say that the application examples described above are merely examples and do not limit the configuration to which the image processing device according to the embodiment can be applied.

As described above, the image processing device according to the present embodiment generates indexes such that influence of crosstalk according to a position of a viewer is negated based on position information indicating the position of the viewer and crosstalk information of the display device 20, and associates the indexes with respective pixels. Then, the image processing device 10 generates viewpoint images corresponding to the generated respective indexes, and causes the generated viewpoint images to be displayed in the pixels associated with the indexes corresponding to the viewpoint images. With this configuration, the image processing device 10 according to the present embodiment can suppress occurrence of blur and double images caused by a deviation of observed viewpoint images (a deviation of the indexes) even when the viewer is located at a position different from the optimum viewing position $M_0$.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Moreover, the effects described in the present specification are merely explanatory or representative, and are not restrictive. That is, the technology according to the present disclosure can exert, together with the above-described effects or instead of the above-described effects, another effect that is obvious for a person skilled in the art based on the description of the present specification.

Additionally, the present technology may also be configured as below.

(1) An image processing method including:
acquiring an original image;
acquiring position information indicating a position of a viewer in a depth direction with respect to a display unit;
acquiring crosstalk information indicating a crosstalk characteristic of the display unit;
causing a processor to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information; and
outputting second viewpoint images corresponding to respective pieces of the control information included in the index map based on the original image and the index map.

(2) The image processing method according to (1), wherein the number of the second viewpoint images output based on the index map is greater than the number of the first viewpoint images corresponding to the respective plurality of viewpoints set in advance.

(3) The image processing method according to (1) or (2),
wherein the first viewpoint images are set in advance in a manner that different viewpoint images are observed at the respective plurality of viewpoints based on a predetermined viewing position in the depth direction, and
wherein the control information included in the index map is generated based on an amount of deviation between the first viewpoint image observed at the predetermined viewing position and the first viewpoint image observed at the position indicated by the position information according to the crosstalk characteristic.

(4) The image processing method according to (3), wherein the amount of deviation is estimated based on a size of crosstalk indicated by the crosstalk information at the position indicated by the position information.

(5) The image processing method according to (4), wherein each piece of the control information included in the index map is generated in a manner that the crosstalk is negated based on the estimated amount of deviation.

(6) The image processing method according to any one of (3) to (5), wherein the index map is generated by converting respective indexes included in an index map set in advance based on the amount of deviation in a manner that different viewpoint images are observed at the respective plurality of viewpoints that are based on the predetermined viewing position.

(7) The image processing method according to any one of (1) to (6),
wherein each piece of the control information included in the index map is converted in a manner that a difference between viewpoint images observed at adjacent respective virtual viewpoints is equal to or smaller than a threshold value, and
wherein the second viewpoint images are output based on an index map obtained by converting the control information.

(8) The image processing method according to any one of (1) to (7), wherein the second viewpoint images corresponding to respective pieces of the control information included in the index map are generated by combining the first viewpoint images.

(9) The image processing method according to any one of (1) to (7), wherein the second viewpoint images corresponding to respective pieces of the control information included in the index map are generated based on the original image.

(10) The image processing method according to any one of (1) to (9), wherein the crosstalk information is associated and stored in the display unit in advance.

(11) An image processing device including:
an image acquisition unit configured to acquire an original image;
a position information acquisition unit configured to acquire position information indicating a position of a viewer in a depth direction with respect to a display unit;
a crosstalk information acquisition unit configured to acquire crosstalk information indicating a crosstalk characteristic of the display unit;
an index map generation unit configured to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information; and
an image generation unit configured to output second viewpoint images corresponding to respective pieces of the control information included in the index map based on the original image and the index map.

(12) An electronic apparatus including:
an image acquisition unit configured to acquire an original image;
a position information acquisition unit configured to acquire position information indicating a position of a viewer in a depth direction with respect to a display unit;
a crosstalk information acquisition unit configured to acquire crosstalk information indicating a crosstalk characteristic of the display unit;
an index map generation unit configured to generate an index map that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information; and
an image generation unit configured to output second viewpoint images corresponding to respective pieces of the control information included in the index map based on the original image and the index map.

What is claimed is:

1. An image processing method comprising:
   acquiring an original image and a parallax map indicating a distribution of parallaxes between different viewpoint images that are set for pixels in the original image;
   acquiring position information indicating a position of a viewer in a depth direction with respect to a display;
   acquiring crosstalk information indicating a crosstalk characteristic of the display;
   causing a processor to generate an index map based on an optimum viewing position of a viewer stored in advance and converted into the index map according to a detected position of the viewer in the depth direction with respect to the display that includes control information indicating a correspondence between respective pixels of the display and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information; and
   preliminarily generating viewpoint images corresponding to respective indexes based on the index map for each virtual viewpoint, combining the preliminarily generated respective viewpoint images generated and outputting second viewpoint images corresponding to respective pieces of the control information included in the index map based on the original image, and the parallax map.

2. The image processing method according to claim 1, wherein the number of the second viewpoint images output based on the index map is greater than the number of the first viewpoint images corresponding to the respective plurality of viewpoints set in advance.

3. The image processing method according to claim 1,
   wherein the first viewpoint images are set in advance in a manner that different viewpoint images are observed at the respective plurality of viewpoints based on a predetermined viewing position in the depth direction, and
   wherein the control information included in the index map is generated based on an amount of deviation between the first viewpoint image observed at the predetermined viewing position and the first viewpoint image observed at the position indicated by the position information according to the crosstalk characteristic.

4. The image processing method according to claim 3, wherein the amount of deviation is estimated based on a size of crosstalk indicated by the crosstalk information at the position indicated by the position information.

5. The image processing method according to claim 4, wherein each piece of the control information included in the index map is generated in a manner that the crosstalk is negated based on the estimated amount of deviation.

6. The image processing method according to claim 3, wherein the index map is generated by converting respective indexes included in an index map set in advance based on the amount of deviation in a manner that different viewpoint images are observed at the respective plurality of viewpoints that are based on the predetermined viewing position.

7. The image processing method according to claim 1,
   wherein each piece of the control information included in the index map is converted in a manner that a difference between viewpoint images observed at adjacent respective virtual viewpoints is equal to or smaller than a threshold value, and
   wherein the second viewpoint images are output based on an index map obtained by converting the control information.

8. The image processing method according to claim 1, wherein the second viewpoint images corresponding to respective pieces of the control information included in the index map are generated by combining the first viewpoint images.

9. The image processing method according to claim 1, wherein the second viewpoint images corresponding to respective pieces of the control information included in the index map are generated based on the original image.

10. The image processing method according to claim 1, wherein the crosstalk information is associated and stored in the display unit in advance.

11. An image processing device comprising:
    an image acquisition unit configured to acquire an original image and a parallax map indicating a distribution of parallaxes between different viewpoint images that are set for pixels in the original image;
    a position information acquisition unit configured to acquire position information indicating a position of a viewer in a depth direction with respect to a display unit;
    a crosstalk information acquisition unit configured to acquire crosstalk information indicating a crosstalk characteristic of the display;
    an index map generation unit configured to generate an index map defined based on an optimum viewing position of a viewer stored in advance and converted into the index map according to a detected position of the viewer in the depth direction with respect to the display that includes control information indicating a correspondence between respective pixels of the display unit and a respective plurality of viewpoints that is based on the position information on the basis of the acquired position information and the acquired crosstalk information in a manner that, among first viewpoint images which are different from each other based on the original image corresponding to the respective plurality of viewpoints set in advance, one of the first viewpoint images is observed while crosstalk is negated at a position indicated by the position information; and
    an image generation unit configured to preliminarily generate viewpoint images corresponding to respective indexes based on the index map for each virtual viewpoint, combine the preliminarily generated respective viewpoint images to thereby generate and output second viewpoint images corresponding to respective pieces of the control information included in the index map based on the original image, and the parallax map.

12. An electronic apparatus comprising:
    an image acquisition unit configured to acquire an original image and a parallax map indicating a distribution of parallaxes between different viewpoint images that are set for pixels in the original image;
    a position information acquisition unit configured to acquire position information indicating a position of a viewer in a depth direction with respect to a display;

a crosstalk information acquisition circuitry configured to acquire crosstalk information indicating a crosstalk characteristic of the display;

an index map generation unit configured to generate an index map based on an optimum viewing position of a viewer stored in advance and converted into the index map according to a detected position of the viewer in the depth direction with respect to the display that includes control information indicating a correspondence between respective pixels of the display unit and a respective plurality of virtual viewpoints that is based on the position information on the basis of the acquired position information and the acquired crosstalk information in a manner that, among first viewpoint images which are different from each other based on the original image corresponding to the respective plurality of virtual viewpoints set in advance, one of the first viewpoint images is observed while crosstalk is negated at a position indicated by the position information; and an image generation unit configured to preliminarily generate viewpoint images corresponding to respective indexes based on the index map for each virtual viewpoint, combine the preliminarily generated respective viewpoint images to thereby generate and output second viewpoint images corresponding to respective pieces of the control information included in the index map based on the original image, and the parallax map.

* * * * *